(12) United States Patent
Shin et al.

(10) Patent No.: US 11,258,285 B2
(45) Date of Patent: *Feb. 22, 2022

(54) USER AWARE CHARGING ALGORITHM THAT REDUCES BATTERY FADING

(71) Applicant: The Regents of The University of Michigan, Ann Arbor, MI (US)

(72) Inventors: Kang G. Shin, Ann Arbor, MI (US); Liang He, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 596 days.

This patent is subject to a terminal disclaimer.

(21) Appl. No.: 15/984,843

(22) Filed: May 21, 2018

(65) Prior Publication Data

US 2018/0351381 A1  Dec. 6, 2018

Related U.S. Application Data

(60) Provisional application No. 62/515,751, filed on Jun. 6, 2017.

(51) Int. Cl.
*H02J 7/00* (2006.01)

(52) U.S. Cl.
CPC .......... *H02J 7/0069* (2020.01); *H02J 7/0003* (2013.01); *H02J 7/0047* (2013.01); *H02J 7/0071* (2020.01); *H02J 7/0086* (2013.01); *H02J 7/00718* (2020.01)

(58) Field of Classification Search
CPC ...................................................... H02J 7/007
See application file for complete search history.

(56) References Cited

U.S. PATENT DOCUMENTS

| 5,028,860 A | 7/1991 | Amano |
| 5,172,044 A | 12/1992 | Sasaki et al. |
| 5,254,931 A | 10/1993 | Martensson |
| 5,736,834 A | 4/1998 | Kuno |
| 6,014,011 A | 1/2000 | DeFelice et al. |

(Continued)

FOREIGN PATENT DOCUMENTS

| WO | WO-02/45238 A2 | 6/2002 |
| WO | WO-2011011755 A2 | 1/2011 |

*Primary Examiner* — Drew A Dunn
*Assistant Examiner* — Tynese V McDaniel
(74) *Attorney, Agent, or Firm* — Harness, Dickey & Pierce, P.L.C.

(57) ABSTRACT

An user-interactive charging paradigm is presented that tailors the device charging to the user's real-time needs. The core of approach is a relaxation-aware charging algorithm that maximizes the charged capacity within the user's available time and slows down the battery's capacity fading. The approach also integrates relaxation-aware charging algorithm existing fast charging algorithms via a user-interactive interface, allowing users to choose a charging method based on their real-time needs. The relaxation-aware charging algorithm is shown to slow down the battery fading by over 36% on average, and up to 60% in extreme cases, when compared with existing fast charging solutions. Such fading slowdown translates to, for instance, an up to 2-hour extension of the LTE time for a Nexus 5X phone after 2-year usage, revealed by a trace-driven analysis based on 976 charging cases collected from 7 users over 3 months.

16 Claims, 23 Drawing Sheets

(56) References Cited

U.S. PATENT DOCUMENTS

| | | | |
|---|---|---|---|
| 6,087,810 A | 7/2000 | Yoshida | |
| 6,342,774 B1 | 1/2002 | Kreisinger et al. | |
| 7,701,173 B2 | 4/2010 | Veselic | |
| 7,800,343 B2 | 9/2010 | Aradachi et al. | |
| 8,754,614 B2 | 6/2014 | Paryani et al. | |
| 8,922,329 B2 | 12/2014 | Davis et al. | |
| 2004/0232884 A1* | 11/2004 | Vaillancourt | H02J 7/0047 320/132 |
| 2005/0035743 A1 | 2/2005 | Kawakami et al. | |
| 2006/0226815 A1 | 10/2006 | Gibbs et al. | |
| 2007/0024246 A1 | 2/2007 | Flaugher | |
| 2007/0075678 A1 | 4/2007 | Ng et al. | |
| 2008/0183408 A1 | 7/2008 | Matsuura et al. | |
| 2008/0278111 A1 | 11/2008 | Genies et al. | |
| 2009/0243549 A1* | 10/2009 | Matsumura | H02J 7/0071 320/155 |
| 2009/0295332 A1 | 12/2009 | Yang et al. | |
| 2010/0033138 A1* | 2/2010 | Alger | H02J 7/0091 320/153 |
| 2010/0127666 A1 | 5/2010 | Ball | |
| 2010/0198536 A1 | 8/2010 | Hess | |
| 2011/0245987 A1 | 10/2011 | Pratt et al. | |
| 2013/0141898 A1 | 6/2013 | Rooms et al. | |
| 2014/0145684 A1 | 5/2014 | Liu et al. | |
| 2014/0253039 A1* | 9/2014 | Barsukov | H02J 7/007184 320/112 |
| 2015/0229151 A1 | 8/2015 | Sudan et al. | |
| 2015/0360578 A1 | 12/2015 | Duan et al. | |
| 2016/0209474 A1* | 7/2016 | Chiu | H02J 7/0071 |
| 2016/0322834 A1* | 11/2016 | Carpenter, Jr. | H02J 7/00 |
| 2018/0048163 A1* | 2/2018 | Deng | H02J 7/0047 |

\* cited by examiner

```
static int qpnp_chg_ibatterm_set(struct qpnp_chg_chip *chip, int term_current){...};
static int qpnp_chg_ibatmax_set(struct qpnp_chg_chip *chip, int chg_current){...};
static int qpnp_chg_vddmax_and_trim_set(struct qpnp_chg_chip *chip, int voltage, in trim_mv){...};
static void qpnp_chg_adjust_vddmax(struct qpnp_chg_chip *chip, int vbat_mv){...};
```

FIG. 28

USER AWARE CHARGING ALGORITHM THAT REDUCES BATTERY FADING

CROSS-REFERENCE TO RELATED APPLICATIONS

This application claims the benefit of U.S. Provisional Application No. 62/515,751, filed on Jun. 6, 2017. The entire disclosure of the above application is incorporated herein by reference.

GOVERNMENT CLAUSE

This invention was made with government support under Grant No. CNS 1446117 awarded by the National Science Foundation. The Government has certain rights in this invention.

FIELD

The present disclosure relates to a charging algorithm that maximizes charged capacity of a battery within the user's available time while reducing battery fading.

BACKGROUND

The limited operation time of mobile devices, such as smartphones, tablets, and laptops, has become the main gripe of user experience, especially with their increasing functionalities and computation power. Worse, batteries become weaker with usage, known as capacity fading, shortening the device operation time. For example, an over 50% capacity fading of a 14-month Galaxy S4 battery has been reported; measurements with a Galaxy S6 Edge phone show a 14% battery capacity fading over 4 months of real-life usage. Also, one user study with 146 participants shows that 89% of them noticed their device operation time shortened under normal usage patterns and 70% of them view it as crucial.

Charging mobile devices fast alleviates users' concern on the limited device operation time by replenishing the devices with energy faster. This has been the focus of both industry and academia, developing and deploying various fast charging technologies, such as Quick Charge 3.0 by Qualcomm, TurboPower by Motorola, VOOC Flash Charge by OPPO, to name a few.

Fast charging, unfortunately, accelerates the capacity fading of device battery owing to, besides the high charging rate, the joint effects of two properties they share: the basic principle of Constant Current, Constant Voltage (CCCV) charge and user-unawareness. State-of-the-art fast charging technologies, in general, follow the classical CCCV charging for Li-ion batteries—a two-phase charging process consisting of (i) Constant-Current Charge (CC-Chg) and (ii) Constant-Voltage Charge (CV-Chg). Also, these fast charging technologies are agnostic of users' available charging time. Implicitly assuming the availability of sufficient charging time, they blindly try to fully charge the devices, resulting in premature termination of the planned charging if users only have limited time. This, in turn, leads to an incomplete or even skipping the CV-Chg phase. Empirical measurements, however, reveal that CV-Chg relaxes the batteries and slows down their capacity fading by up to 80%—an incomplete CV-Chg shortens the battery life faster.

This limitation of fast charging motivated us to design an improved user-interactive charging paradigm that tailors the device charging to the users' real-time needs (referred to herein as iCharge). At the core of this approach is a relaxation-aware (R-Aware) charging algorithm that plans the device charging based on the users' available time. R-Aware maximizes the charged capacity while ensuring the use of CV-Chg to relax the battery, thus improving battery health and device operation time in the long run. Note that CV-Chg is slow in charging the device, thus limiting the power of charging devices. To remedy this problem, R-Aware shortens and triggers the CV-Chg phase earlier than the original CCCV by introducing a new control knob to CCCV and determining the proper charging profiles based on the user's available time.

This section provides background information related to the present disclosure which is not necessarily prior art.

SUMMARY

This section provides a general summary of the disclosure, and is not a comprehensive disclosure of its full scope or all of its features.

A method is presented for charging a battery cell having lithium-ion composition. The method includes: receiving a user available time in which the battery cell is to be charged; determining a threshold voltage to which the battery cell is to be charged with a constant current, where the threshold voltage is less than a maximum voltage to which the battery cell can be charged to; delivering the constant current to the battery cell until voltage of the battery cell reaches the threshold voltage; determining a secondary voltage which is to be applied constantly to the battery cell during a secondary charging phase, such that the secondary voltage is constrained by the user available time and a duration in which the secondary voltage is applied to the battery cell is minimized while achieving a state of equilibrium for relaxation voltage of the battery cell after terminating the constant current; and applying the secondary voltage to the battery cell until charging current for the battery cell falls below a current cutoff limit, where the secondary voltage is applied in response to detecting that the cell voltage equals the threshold voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 28 shows driver interfaces to configure the charging profile in Android kernel;

Corresponding reference numerals indicate corresponding parts throughout the several views of the drawings.

DETAILED DESCRIPTION

Example embodiments will now be described more fully with reference to the accompanying drawings.

Batteries get weakened over usage, shortening their device operation time. For example, an over 50% capacity fading of a 14-month Galaxy S4 battery is reported in the literature, shortening device operation time by over 4 hours. The capacity fading of device batteries becomes more critical as mobile devices with non-replaceable batteries—such as iPhones and Galaxy S6 and their descendants—are becoming a new trend.

The capacity fading of batteries is inevitable due to their intrinsic electrochemical characteristics, e.g., loss of active materials over usage. Their fading rates, however, depend on their usage pattern. In this disclosure, we focus on how the charging of mobile devices affects the fading of their battery capacity.

Various fast charging technologies have been developed and deployed to improve user experience. These technologies can be viewed as various extensions of the classical two-phase CCCV charging of Li-ion batteries, described by $$\langle I_{cc}, V_{max}, I_{cutoff} \rangle_{cccv} \tag{1}$$

Figure 1:
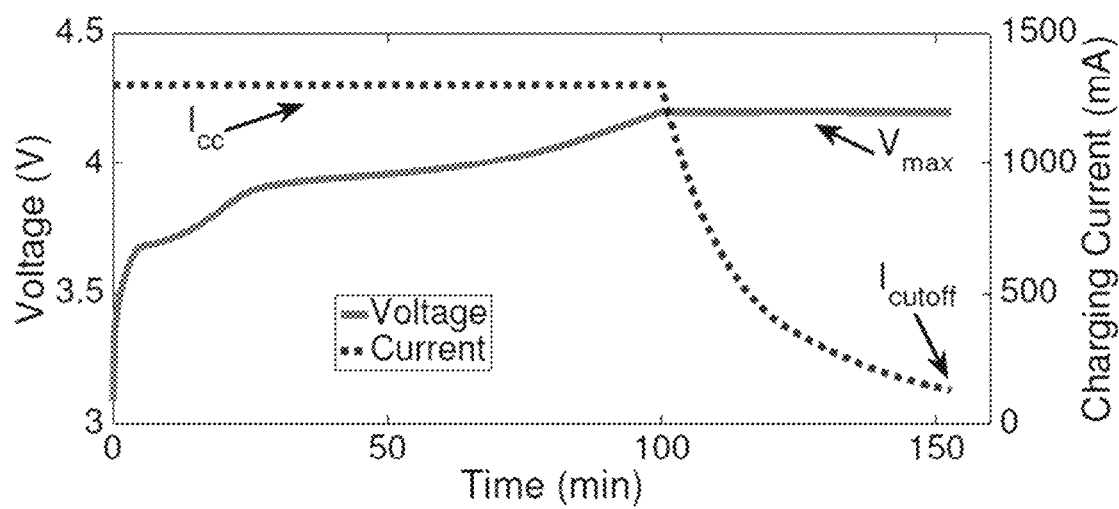
FIG. 1 is a graph depicting the CCCV-based charging process.
Figure 2A:
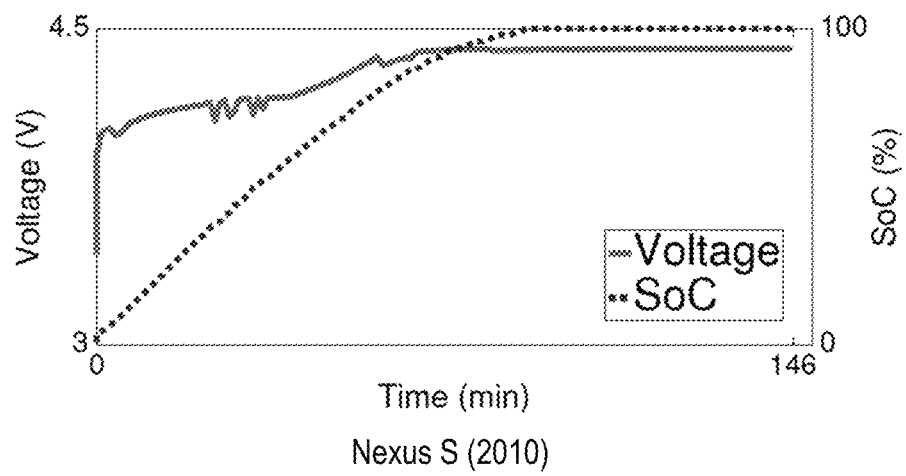
FIGS. 2A-2F are graphs showing charging mobile devices with respective chargers.
Figure 2B:
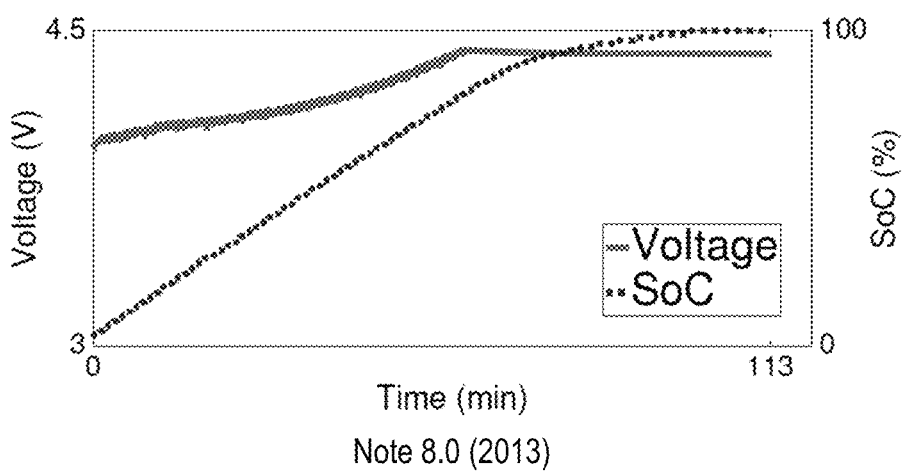
Figure 2C:
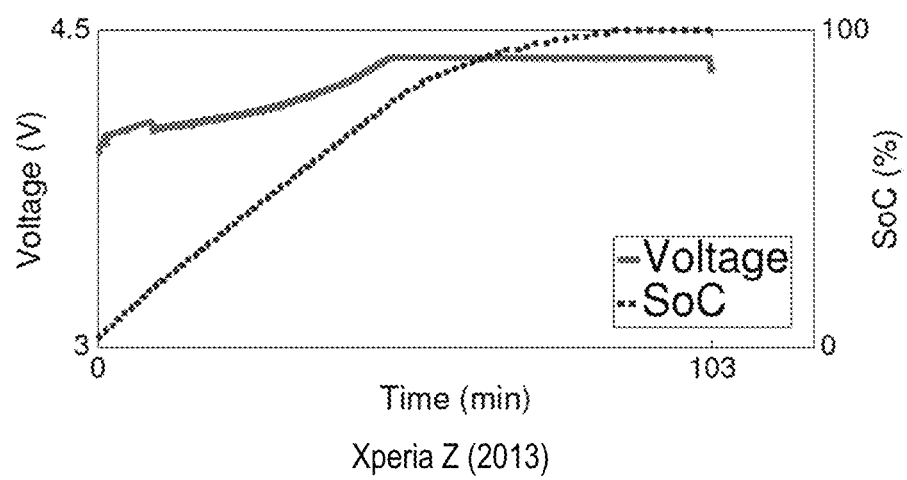
Figure 2D:
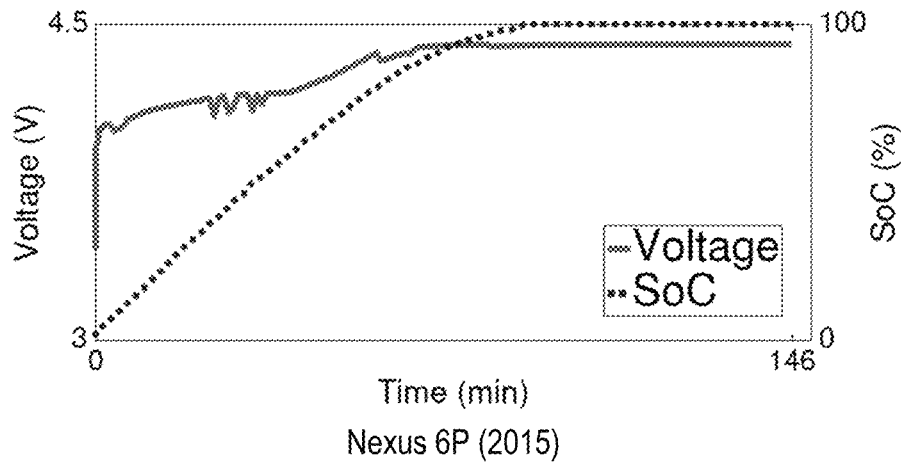
Figure 2E:
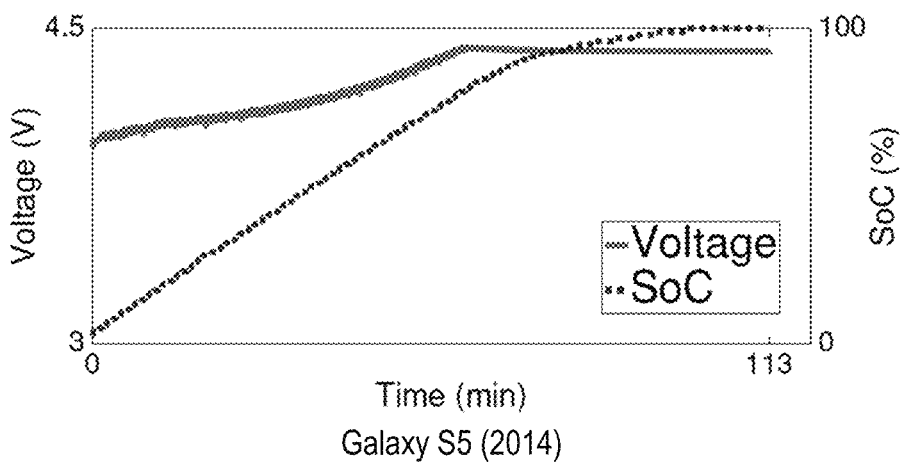
Figure 2F:
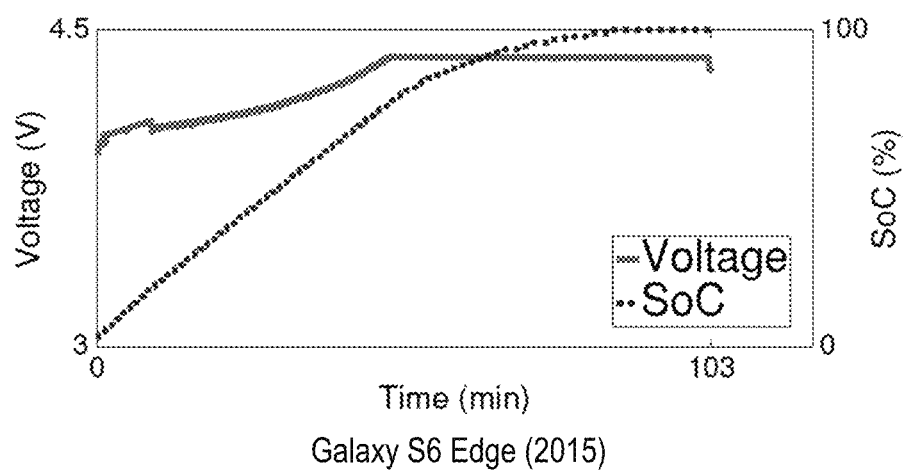

First, the battery is charged with a large and constant current $I_{cc}$ (normally 0.5-1 C) until its voltage reaches the fully-charged level $V_{max}$ (e.g., 4.25V), i.e., Constant-Current Charge (CC-Chg), during which its state-of-charge (SoC) increases quickly. Then the battery is charged further by a constant voltage $V_{max}$ until the charging current decreases to a pre-defined cutoff level $I_{cutoff}$ (normally 0.025-0.05 C), fully charging the battery. This second phase is called the Constant-Voltage Charge (CV-Chg). FIG. 1 plots empirically collected data of CCCV-based charging of a Li-ion battery.

To examine how this CCCV principle is implemented in commodity devices, the charging processes of 6 mobile devices was recorded as shown in FIG. 2—from depleted to fully charged and with their respective chargers—and the following three key observations were made.

First, the time to fully charge these devices has been shortened with the advance of charging technologies, e.g., from 188 minutes for Nexus S released in 2010 to 113 minutes for the 2014 Galaxy S5, but it still takes about 100 minutes to fully charge even for the fastest charging Galaxy S6 Edge.

Second, all of these charging processes, in principle, follow the CCCV charging—the devices are charged quickly during the first phase until their batteries reach about 4.25-4.4 V, after which a constant voltage is applied until they become fully charged.

Third, CC-Chg is the major phase to charge devices. In contrast, CV-Chg is slow and takes long in charging the device batteries, e.g., CV-Chg for Galaxy S6 Edge takes ≈55% of the total time to charge the last 20% capacity.

Figure 3A:
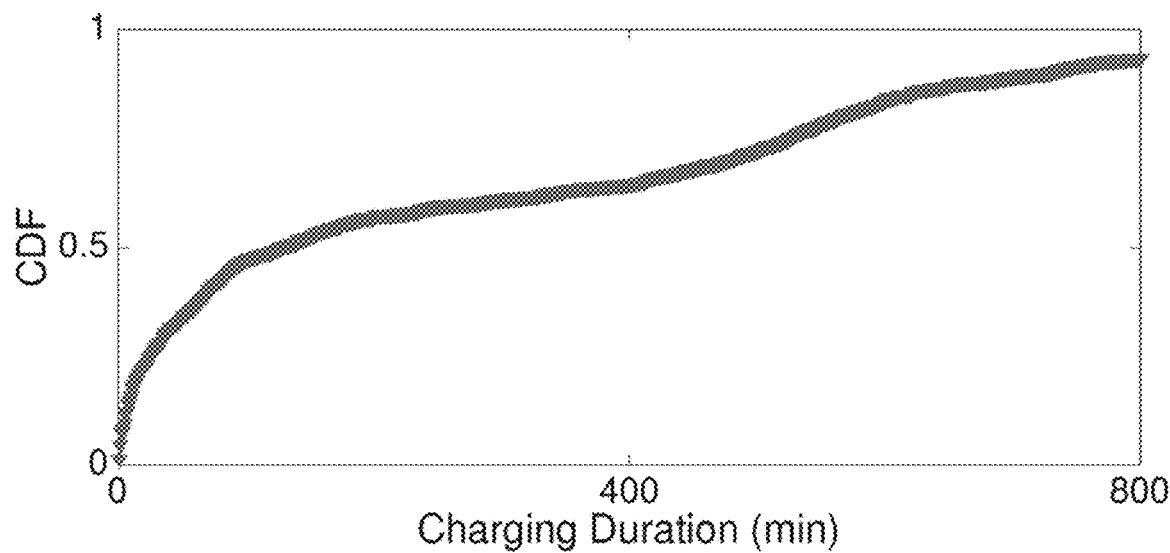
FIGS. 3A and 3B are graphs showing users' charging behavior: charging duration and end-of-charge state of charge, respectively.
Figure 3B:
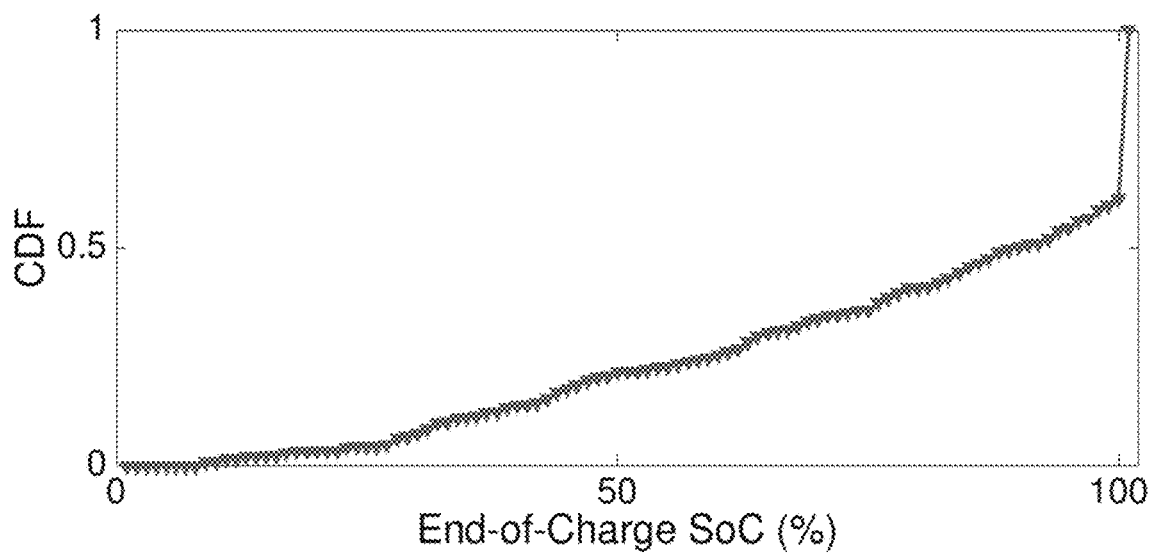

To see how these charging technologies are used in real-life, FIG. 3A plots the charging time distributions of 976 cases collected from 7 users over 3 months. About 50% of the charging is observed to last less than 2 hours, representing the device charging during daytime. Comparison of this with FIG. 2 indicates that these short charging durations may not be enough to fully charge the devices. To validate this, the battery SoC (State-of-Charge) was recorded—an indicator of battery's remaining capacity in percentage (0%=empty; 100%=full) when charging is terminated, and their distributions plotted in FIG. 3B. As expected, the device charging is prematurely terminated, leading to an incomplete CV-Chg with a 61% probability. Table 1 below shows the details of the individual users' charging behavior. Moreover, 80% SoC is considered as the threshold for the charging to switch from CC-Chg to CV-Chg, which is roughly the case shown in FIG. 2. This way, it was found that about 41% of charging cases terminated prematurely without CV-Chg at all.

TABLE 1

Statistics of users' charging behavior.

| User | #1 | #2 | #3 | #4 | #5 | #6 | #7 |
|---|---|---|---|---|---|---|---|
| Incomp. Ratio | 0.93 | 0.69 | 0.60 | 0.51 | 0.63 | 0.14 | 0.80 |
| # Charges/Day | 2.05 | 2.41 | 1.40 | 2.28 | 1.57 | 1.76 | 3.79 |

Skipping the slow and long CV-Chg does not reduce the charged capacity much. However, CV-Chg slows down the capacity fading of batteries and thus improves their lifetime—a new discovery from the measurement study.

Figure 4:
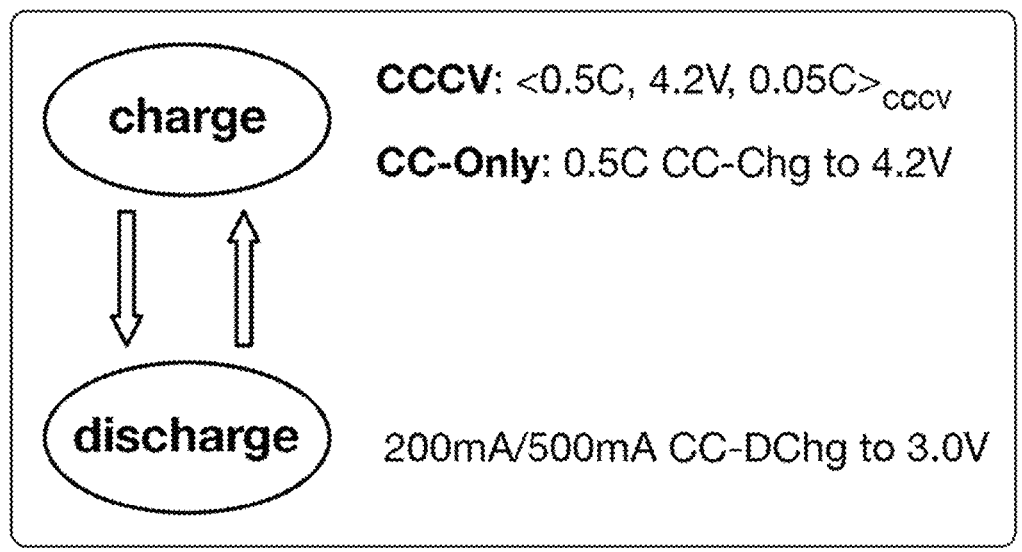
FIG. 4 is a diagram showing cycling test methodology.
Figure 5:
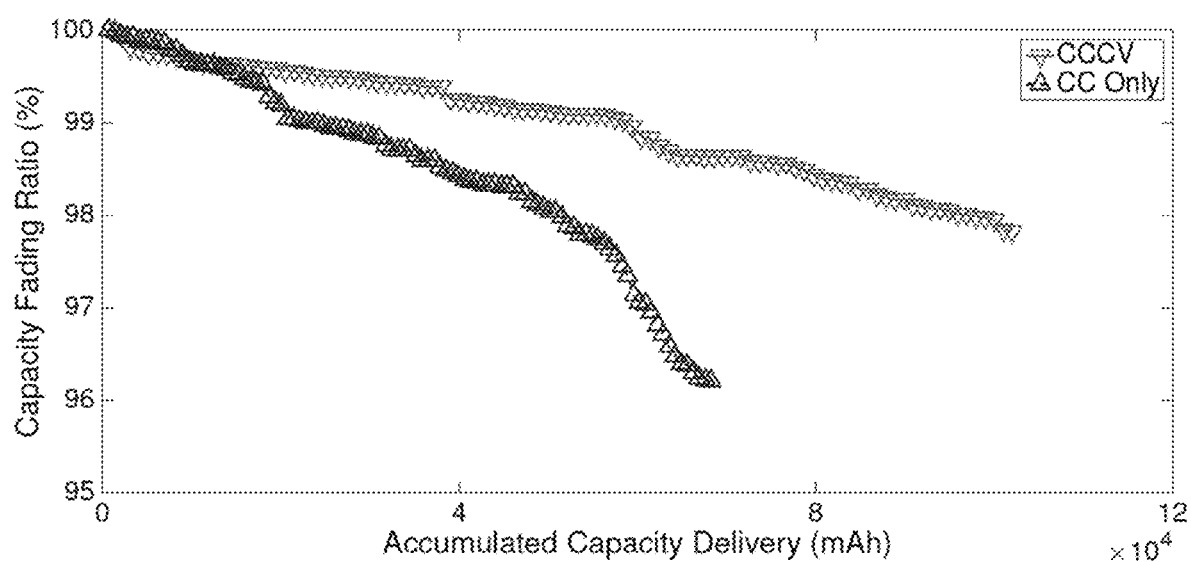
FIG. 5 is a graph showing capacity fading of a Nexus S battery over 100 cycles.
Figure 6:
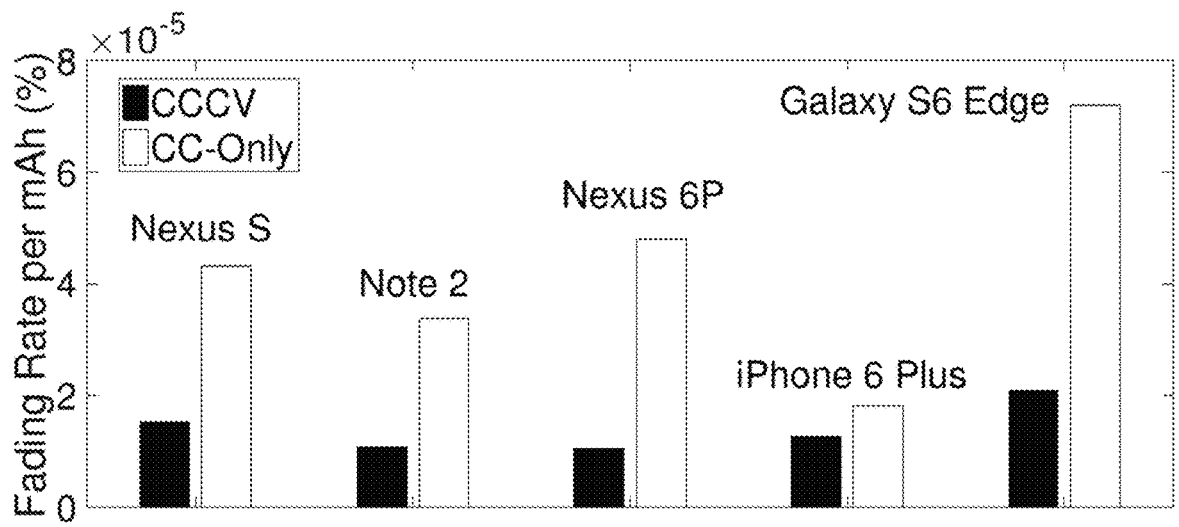
FIG. 6 is a graph showing capacity fading of 5 phone batteries over 100 cycles which illustrates the slow-down of capacity fading with CV-Chg.

Cycling tests was conducted with the batteries of Nexus S, Note 2, Nexus 6P, iPhone 6 Plus, and Galaxy S6 Edge to corroborate this finding. The 8-channel NEWARE battery testers are used as both the charger and the load, with which the battery charging and discharging can be programmed with error ≤0.05% and logged at frequency up to 10 Hz. The batteries are charged and discharged 100 times/cycles with completed CCCV (i.e., ensuring the use of CV-Chg) and CC-Chg only (i.e., skipping CV-Chg), respectively, as illustrated in FIG. 4. The batteries' capacity delivery is recorded during each discharging to calculate their capacity fading ratio—the ratio of the delivered capacity during the i-th cycle to that during the first cycle. FIG. 5 shows the degradation processes of the Nexus S battery during the measurement as an illustrative example. FIG. 6 plots the batteries' fading ratios after these cycling tests, showing that CV-Chg reduces battery fading by 0.00003% per-delivered-capacity—an averaged slowdown of 62.35% and up to 80% in some extreme cases, e.g., for the Nexus 6P battery.

Li-ion batteries operate according to the principle of intercalation: during charging, Li-ions is extracted from the lattice of the active materials at the cathode, and then inserted at the anode; the process is reversed for discharging. The insertion of Li-ions causes volume expansion of the materials' lattice structure, while extraction causes contraction. The expansion and contraction are pronounced with large currents and their frequency depends on the switching between charging and discharging. High magnitude and frequency of expansion/contraction accelerate the fracture of lattice structure, leading to permanent loss of active materials and thus capacity fading of Li-ion batteries. The gradually decreasing CV-Chg current allows the anode's (cathode's) lattice volume to equilibrate after the intensive contraction (expansion) during the following discharging, relaxing the active materials. This slows down the fracture of lattice structure and thus battery fading. The decreasing current also reduces battery heating, which is another key factor pronouncing battery degradation. While reference is provided throughout this disclosure to battery cells having lithium ion chemistry, it is readily understood that the broader aspect of the charging algorithm set forth herein is applicable to rechargeable battery cells having other types of chemistries as well.

Note that both the insertion and extraction of Li-ions are achieved via chemical reactions requiring certain time, which could fail if the current is terminated before the completion. For battery charging, this is reflected by a voltage drop of the battery upon the current termination, a key fact in this design.

Figure 7:
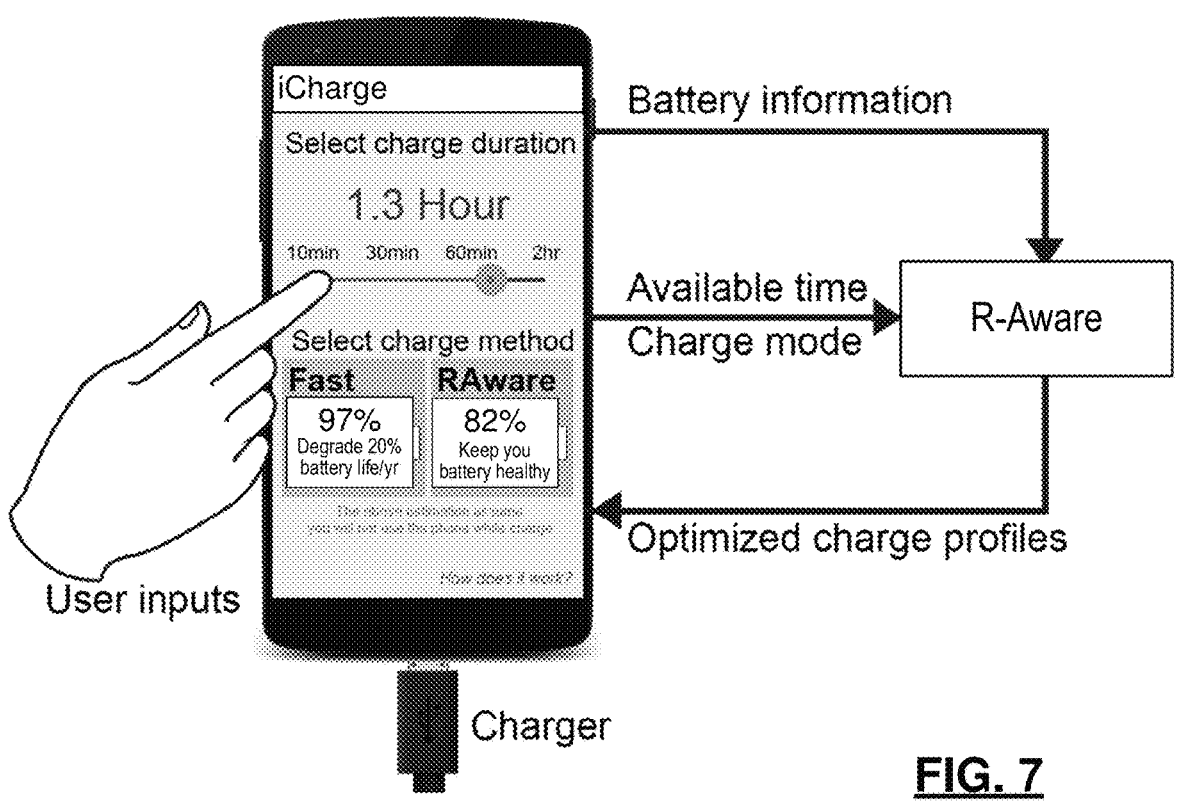
FIG. 7 illustrates a proposed charging algorithm that tailors the device charging to the user's available time.

FIG. 7 presents an overview of the proposed charging algorithm. Upon connection of the charger, a user interface—e.g., consisting of a seekbar and two buttons—prompts the device operator. The seekbar allows the user to specify his available time for device charging and the buttons show the charging results with conventional fast charging methods and the proposed R-Aware method, respectively. The seekbar is one implementation for capturing user available charge time and others are contemplated by this disclosure. In response to receiving the user available charge time, the user chooses his preferred charging profile—how long to charge with which method—based on his real-time needs simply by clicking the corresponding button, and then the device is charged accordingly.

Figure 8:
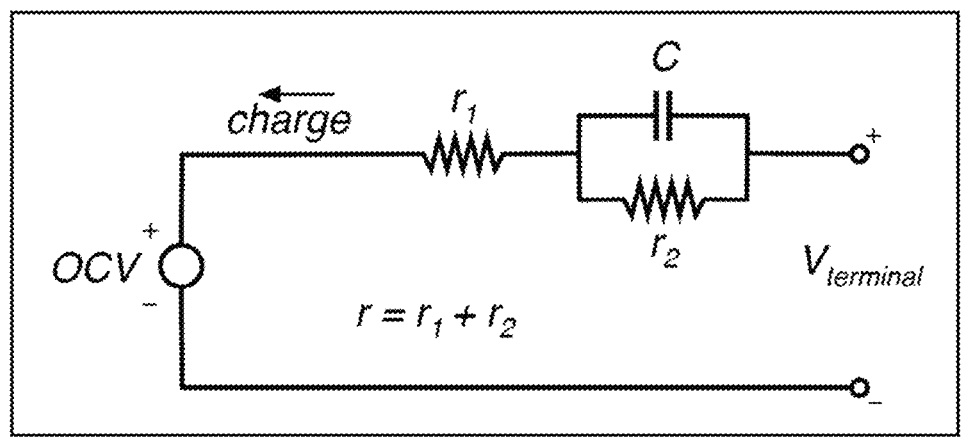
FIG. 8 is a schematic of a battery circuit model.

To facilitate the understanding of the proposed charging method, some background is provided on battery charging. Battery voltage plays a key in charging. The open circuit voltage (OCV) of a battery is the voltage between its terminals without connecting load, which becomes the terminal voltage of the battery when load is connected. In other words, OCV is an inherent battery property and the terminal voltage is what is measured in practice. FIG. 8 shows the commonly used battery circuit model, from which we get $$V_{terminal} = OCV + I \cdot (r_1 + r_2), \quad (2)$$

where I is the current charging the battery, and $r_1$ and $r_2$ are the battery's ohmic and capacitive resistance, respectively. Voltage is used when referring to the terminal voltage and define $r = r_1 + r_2$.

Figure 9:
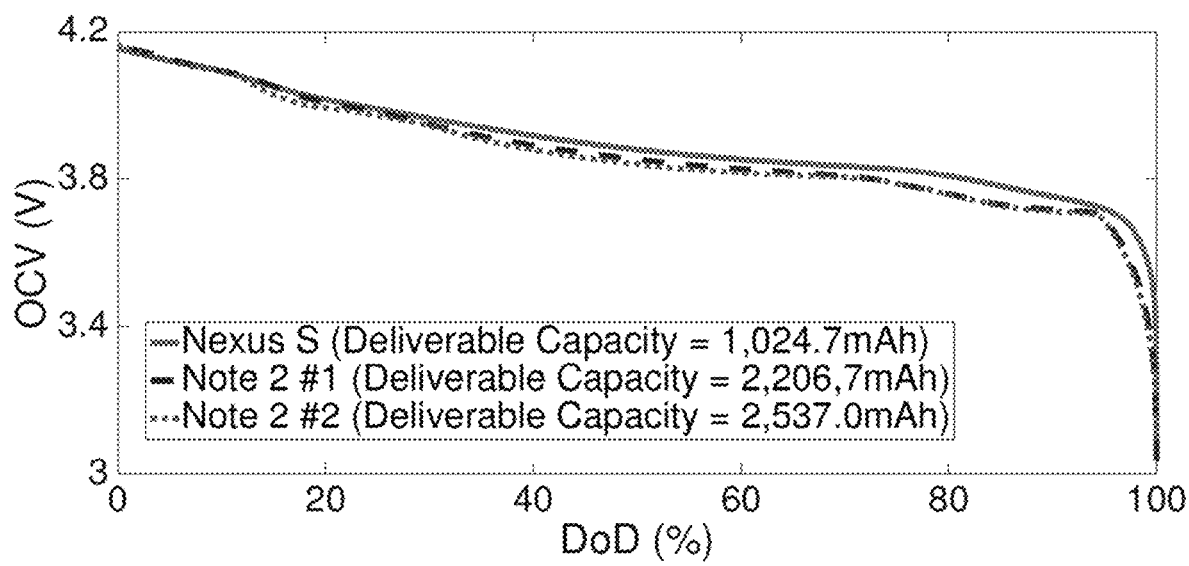
FIG. 9 is a graph showing the nonlinearity between battery open circuit voltage and DoD.
Figure 10:
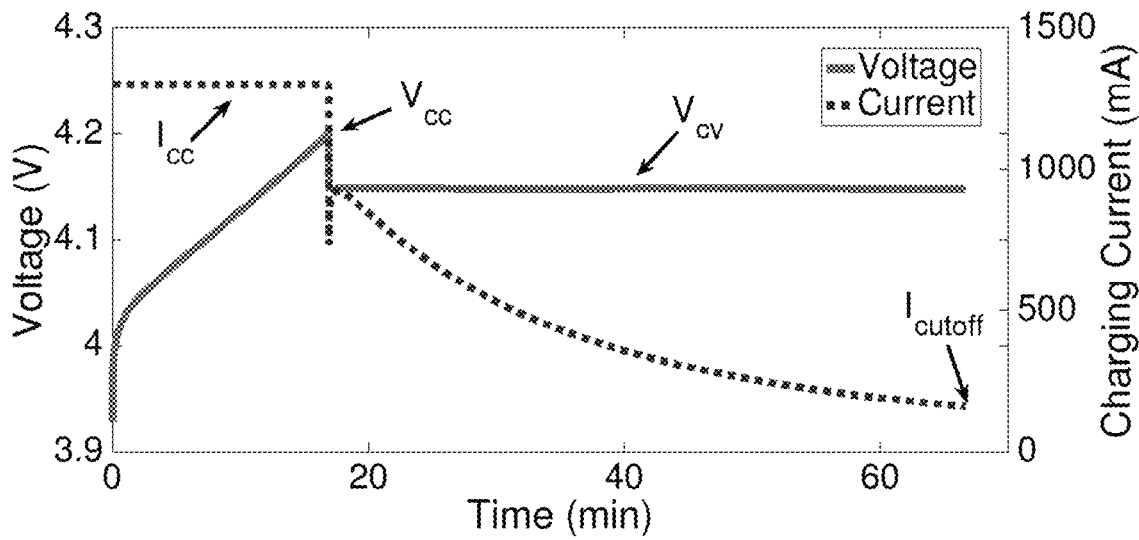
FIG. 10 is a graph depicting the R-Aware based charging process.

Batteries exhibit a monotonic relationship between their OCVs and DoDs (Depth-of-Discharge), where DoD describes the battery capacity that has been discharged as the percentage of its maximum capacity, i.e., the inverse of state-of-charge. This relation is stable for batteries of the same chemistry and does not vary much with manufacturers (e.g., <5 mV variances in OCV with given DoD. FIG. 9 plots empirically collected OCV-DoD curves with one Nexus S battery and two Note 2 batteries. Although these batteries are different in both rated and deliverable capacities, their OCV-DoD curves are close to each other, thus validating the stable OCV-DoD relation. How the curves in FIG. 10 are obtained will be further described below. This monotonic OCV-DoD relation allows the mapping between them, denoted as $\mathbb{D}(v)$ and $\mathbb{O}(d)$, respectively in the rest of the disclosure.

FIG. 9 also shows that the OCV-DoD relation is not linear—the OCVs are more sensitive to DoDs when the batteries are nearly fully charged (e.g., below 20% DoD), but are not very sensitive in certain middle ranges, e.g., between 40-80% DoD. This non-linearity plays a crucial role in battery charging, as will be seen later.

As the core of the proposed charging method, R-Aware offers an alternative to fast charging when fast charging is not strictly required. R-Aware takes the user's available time and other battery information, such as its OCV-DoD table and initial OCV $v_0$ as input, and then plans the charging process to maximize the charged capacity while ensuring the use of CV-Chg.

R-Aware is an extension of CCCV, i.e., a two-phase charging algorithm described by four control parameters $$<I_{cc}, V_{cc}, V_{cv}, I_{cutoff}>_{R-Aware}(V_{cv} \leq V_{cc} \leq V_{max}). \quad (3)$$

The R-Aware based charging process starts with CC-Chg with current $I_{cc}$ until the batter voltage rises to $V_{cc}$, and then the battery is charged with CV-Chg with voltage $V_{cv}$ until the current falls to $I_{cutoff}$ as illustrated in FIG. 10. In this way, the key to the R-Aware method is identifying a proper combination of the four control parameters in equation (3).

Figure 11:
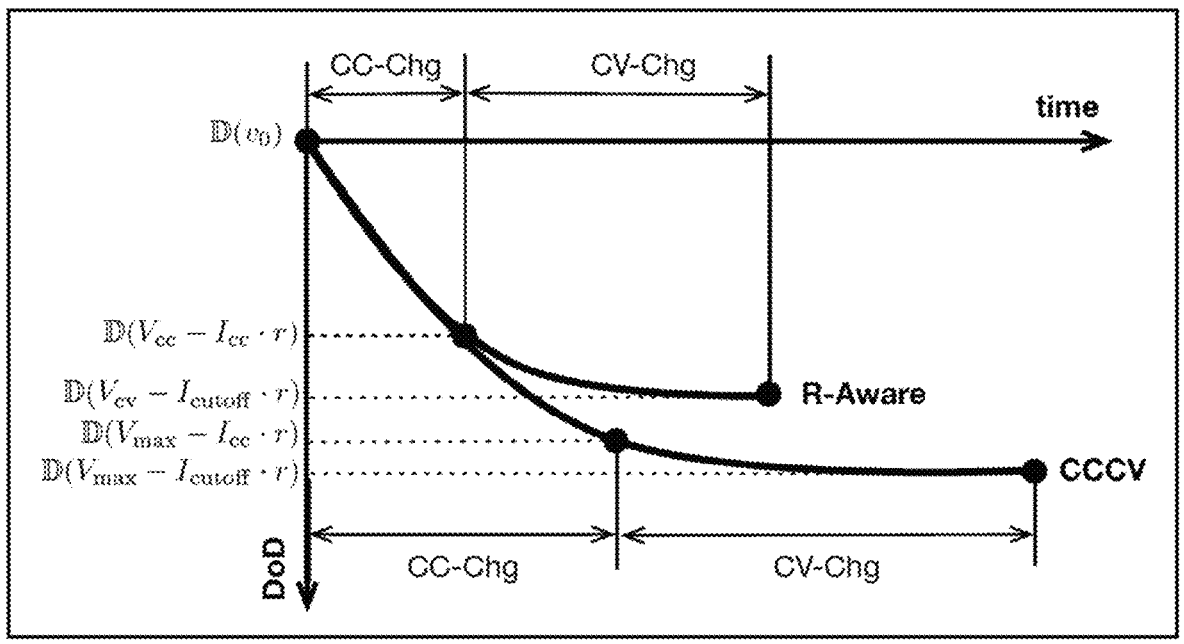
FIG. 11 is a graph showing a comparison between R-Aware and CCCV.

CV-Chg takes long and is slow in charging rate, hence limiting the charged capacity within the available time. R-Aware remedies this problem by initiating it earlier and making it shorter. This is illustrated in FIG. 11 which shows the battery's DoD trace during R-Aware-based charging process and compares it with that of the original CCCV.

R-Aware first extends CCCV by reducing $V_{max}$ to $V_{cc}$. This way, CC-Chg charges the battery to the OCV of $V_{cc}-I_{cc}\cdot r$, which is smaller than the original CCCV (i.e., $V_{max}-I_{cc}\cdot r$), leading to shorter CC-Chg and thus triggering CV-Chg earlier.

Triggering CV-Chg earlier, however, may lead to a longer CV-Chg. This also leads to an interesting finding that, when the use of a complete CV-Chg is required, charging less capacity does not necessarily result in a shorter charging time.

Figure 12A:
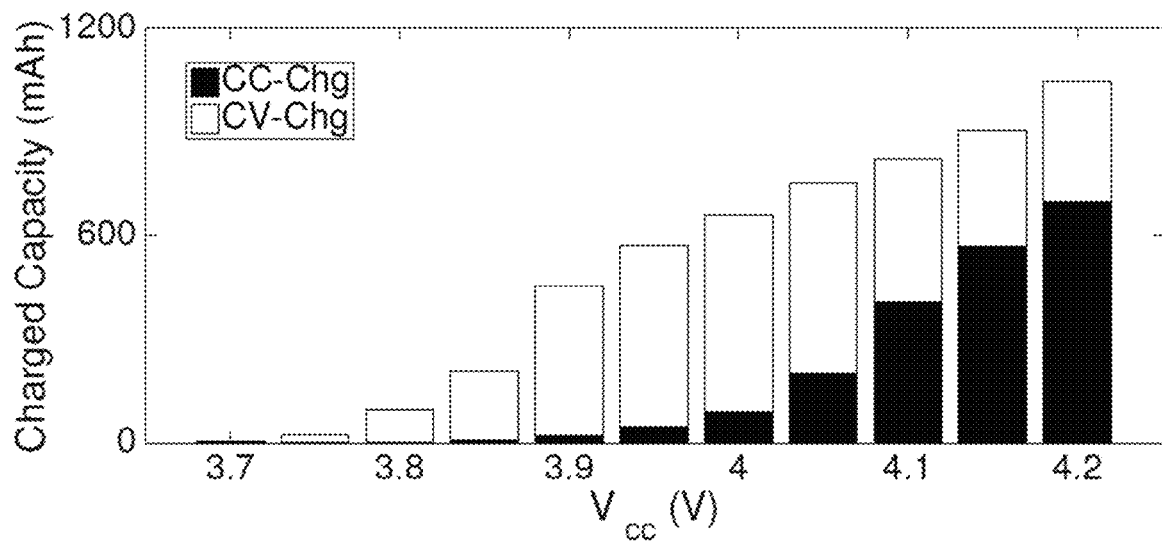
FIGS. 12A and 12B are graphs showing a smaller $V_{cc}$ leads to less charged capacity but not necessarily shorter charging time.
Figure 12B:
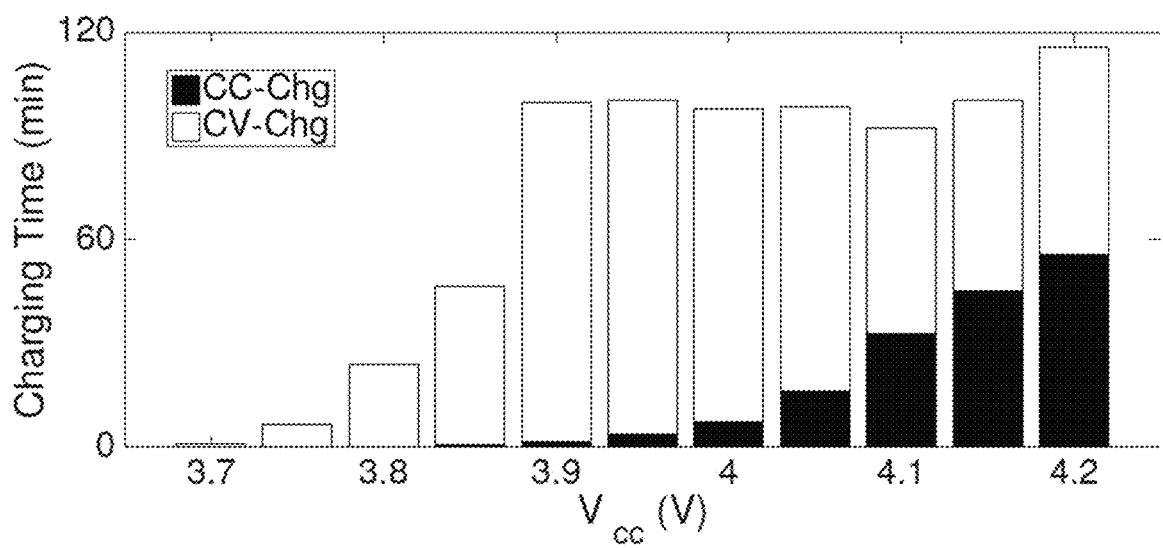
Figure 13:
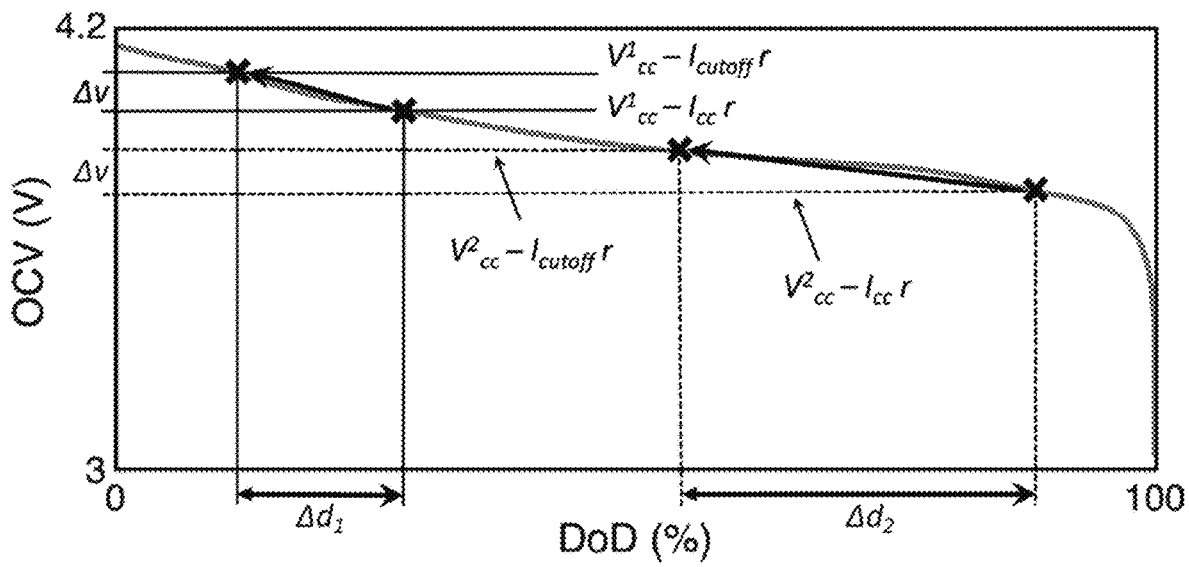
FIG. 13 is a graph showing same magnitude of OCV change may lead to significantly different magnitudes of DoD changes.

To demonstrate this, the profiles of <0.5 C, $V_{cc}$, 0.05 $C>_{cccv}$ were used to charge a Nexus S battery with various $V_{cc}$ from 3.7V to 4.2V. FIGS. 12A and 12B compare the charged capacity and the charging durations, showing that a smaller $V_{cc}$ leads to less charged capacity and charging time is due to the nonlinearity between the battery's OCV and DoD. Let's consider the case when reducing $V_{cc}$ from $V_{cc}^1$ to $V_{cc}^2$ ($V_{cc}^1>V_{cc}^2$). From FIG. 11, it is known that the OCV range within which CC-Chg applies shrinks from [$v_0$, $V_{cc}^1-I_{cc}\cdot r$] to [$v_0$, $V_{cc}^2-I_{cc}\cdot r$], leading to shorter CV-Chg. However, the OCV range for which CV-Chg is responsible are [$V_{cc}^1-I_{cc}\cdot r$, $V_{cc}^1-I_{cutoff}\cdot r$] and [$V_{cc}^2-I_{cc}\cdot r$, $V_{cc}^2-I_{cutoff}\cdot r$] before and after the charge, respectively. These OCV ranges may map to different DoD intervals (and thus to-be-charged capacities) because of the nonlinear OCV-DoD table, albeit sharing the same OCV gap of $(I_{cc}-I_{cutoff})\cdot r$. FIG. 13 illustrates the case in which the same magnitude of OCV change (i.e., $\Delta_v$) results in significantly different magnitudes of DoD changes (i.e. $\Delta d_1 \ll \Delta d_2$). Thus, a smaller $v_{cc}$ shortens CC-Chg, but may lead to longer CV-Chg—the overall charging time is not necessarily reduced.

R-Aware further extends CCCV by providing another control parameter $V_{cv}$ ($V_{cv} \leq V_{cc}$) to reduce the OCV range of CV-Chg from [$V_{cc}-I_{cc}\cdot r$, $V_{cc}-I_{cutoff}\cdot r$] to [$V_{cc}-I_{cutoff}\cdot r$, $V_{cv}-I_{cutoff}\cdot r$], making CV-Chg shorter.

Figure 14:
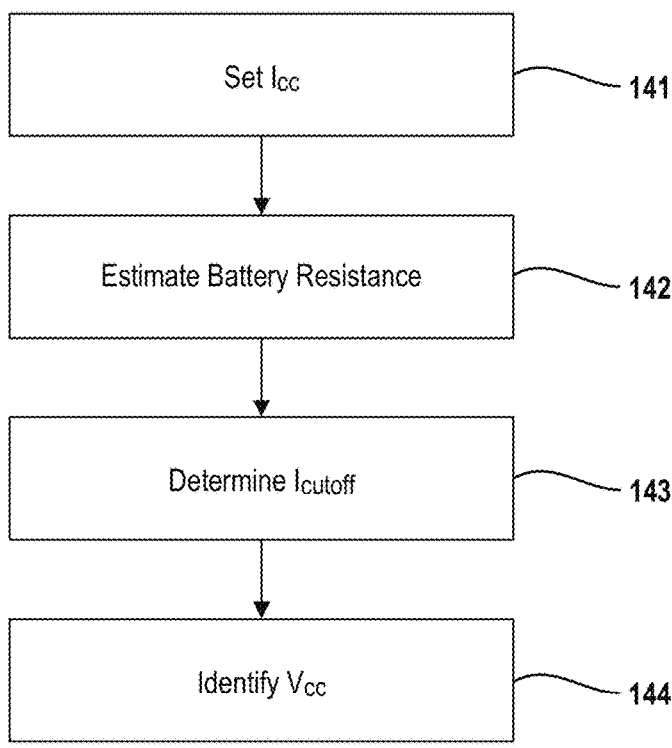
FIG. 14 is a flowchart depicting steps of the R-Aware charging method.
Figure 15:
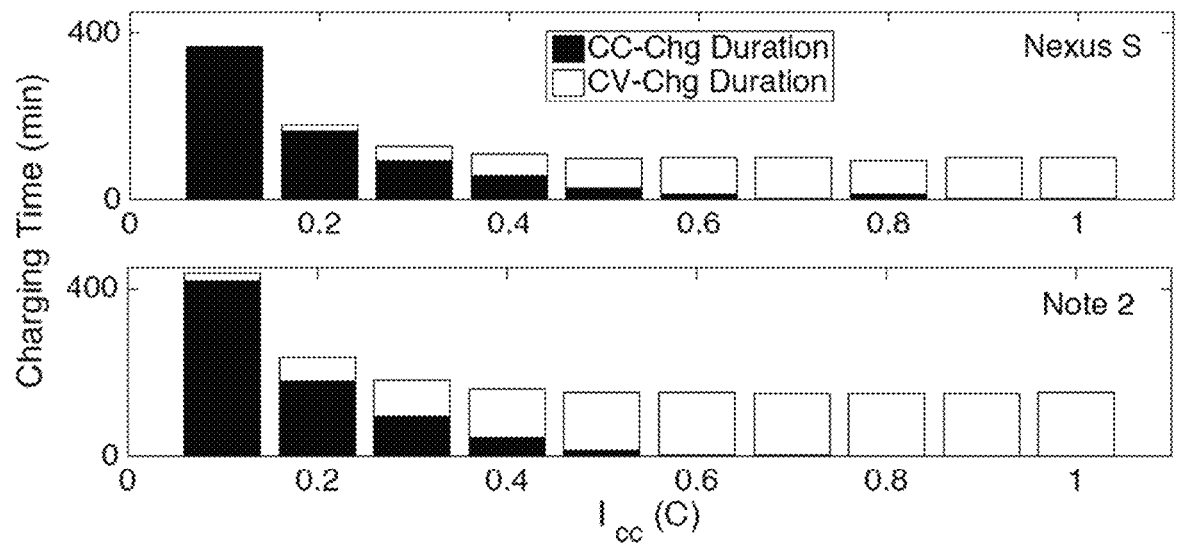
FIG. 15 is a graph showing over-large $I_{cc}$ cannot further shorten the charging process.

FIG. 14 illustrates an example technique for determining these four control parameters for the proposed charging algorithm. To start, the constant current, $I_{cc}$, is set to a value as indicated at 141. Intuitively, a larger $I_{cc}$ shortens the charging process. An over-large current, however, has a diminishing effect on further reduction of the charging time, as shown in FIG. 15, where Nexus S and Note 2 batteries are charged with $I_{cc}$ that varies from 0.1 to 1.0 C. This is because CC-Chg charges the battery to ($V_{cc}-I_{cc}\cdot r$), and CV-chg further charges it to ($V_{cv}-I_{cutoff}\cdot r$). All things being equal, a larger $I_{cc}$ completes CC-Chg faster but extends the OCV range of CV-Chg. Whether or not the overall charging process is shortened is unclear. Also, a larger charging current leads to a faster temperature rise of the battery, due to the heating on its internal resistance. The charging current has to be reduced to cool the battery once its temperature rises to a pre-defined safety threshold, e.g., 45° C. for Nexus 5X. This, again, indicates that a larger $I_{cc}$ may not always be good.

As a result, instead of advocating larger charging currents, R-Aware uses the same $I_{cc}$ as in the conventional fast charging algorithm that is implemented of the device. That is, the value for the constant current is set at 141 in the same manner as a conventional fast charging algorithm. For example, the constant current can be set as the value of the maximum charging current specified in the charger driver of the phone.

Figure 16:
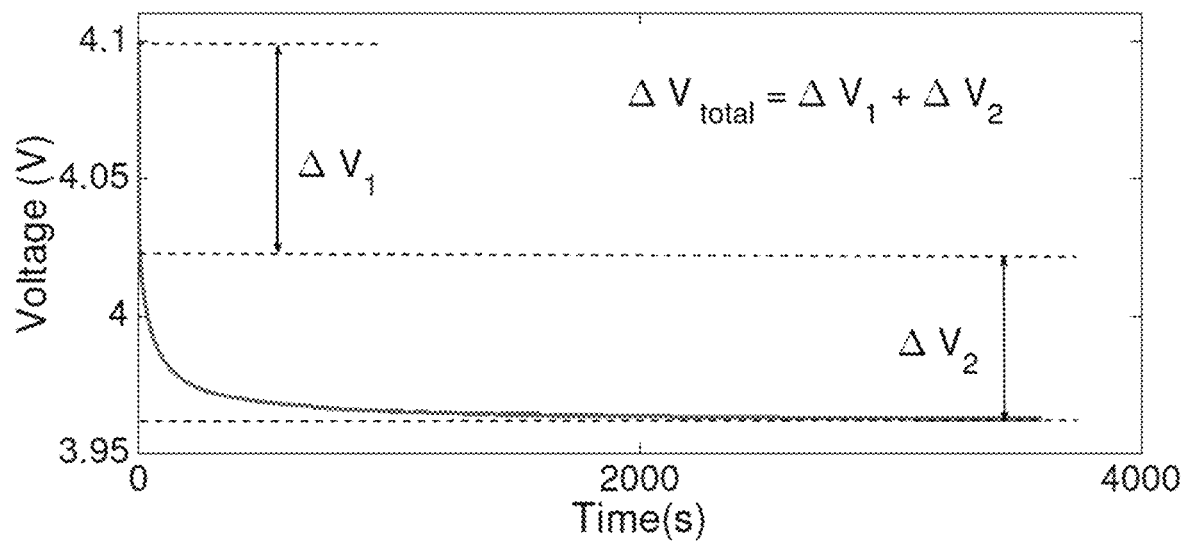
FIG. 16 is a graph showing a two-phase voltage drop after terminating the charging current.

CV-Chg slows down the battery fading by allowing it to equilibrate, but is slow in charging the battery. R-Aware ensures a CV-Chg to be only long enough for equilibration, which is, in turn, indicated by the battery's voltage-drop after terminating the charging current. FIG. 16 plots the battery voltage during a 1-hour idle period after terminating the charging current. The voltage drops instantly by a certain level (i.e., $\Delta V_1$) upon current termination, then it decreases gradually by another level (i.e., $\Delta V_2$). This can be explained with the battery circuit model in FIG. 8—the instantaneous drop $\Delta V_1$ is due to the immediate disappearance of voltage across $r_1$ upon current termination, and the following gradual drop $\Delta V_2$ is due to the gradual effect of $r_2$, thanks to the parallel capacitor. In the literature, it has been shown that $\Delta V_2$ is the result of relaxation and a smaller $V_2$ indicates a closer equilibrium. This way, R-Aware selects $I_{cutoff}$ that ensures small enough $\Delta V_2$, e.g., 0.02V.

Figure 17:
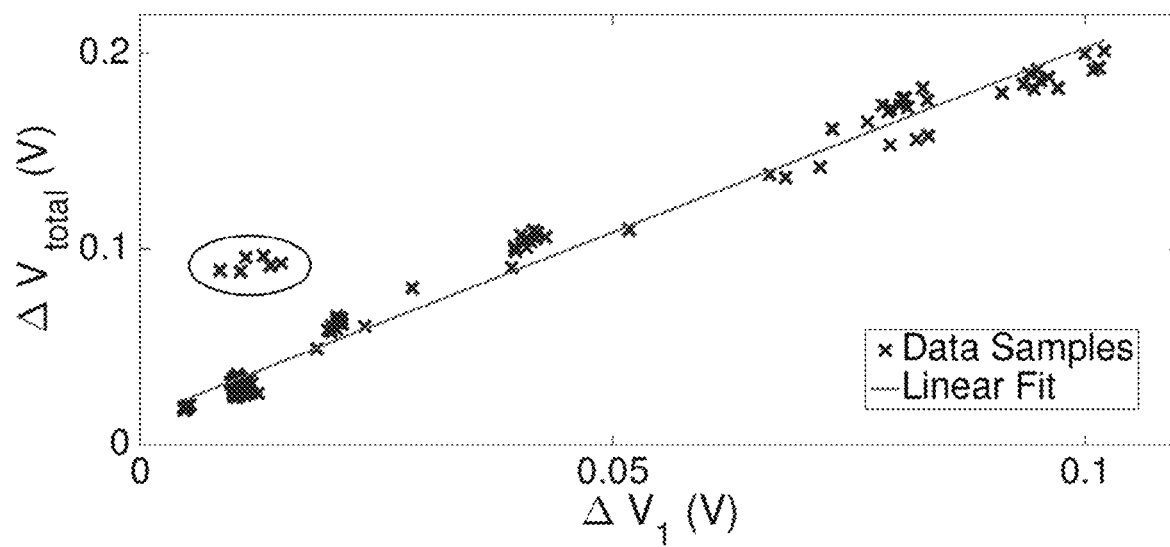
FIG. 17 is a graph showing the linearity between instant voltage drop ($\Delta V_1$) and total drop ($\Delta V_{total}$)

$\Delta V_2$ is estimated with given $I_{cutoff}$ based on empirical finding that $\Delta V_1$ is linear in $\Delta V_{total}=\Delta V_1+\Delta V_2$, i.e., $\Delta V_{total}=\alpha \cdot \Delta V_1$ b for certain coefficients a and b, and thus linear in $\Delta V_2$ as well. FIG. 17 shows such a plot based on 152 voltage-drop traces after charging batteries with profiles summarized in Table 2 below. Most of these data samples follow a linear relation well, e.g., the linear fit shown in FIG. 17 has a mean-squared error of 1.77e-04. Outliers, however, exist as highlighted. A closer examination reveals a common feature in them that there is no CV-Chg in their corresponding charging traces. This linear relation allows one to estimate $\Delta V_2$ if one can (i) identify the linear coefficients, (ii) estimate $\Delta V_1$, and (iii) ensure CV-Chg is used during charging.

TABLE 2

| Measurement settings to validate $\Delta V_{total} = \alpha \cdot \Delta V_1 + b$. | | | | | |
|---|---|---|---|---|---|
| #Batt. | Ini. V. | $I_{cc}$ | $V_{cc}$ | $V_{cv}$ | $I_{cutoff}$ |
| 7 | 3.0-3.24 V | 0.19-1 C | 3.8-4.2 V | 3.8-4.2 V | 0.025-0.4 C |

Figure 18:
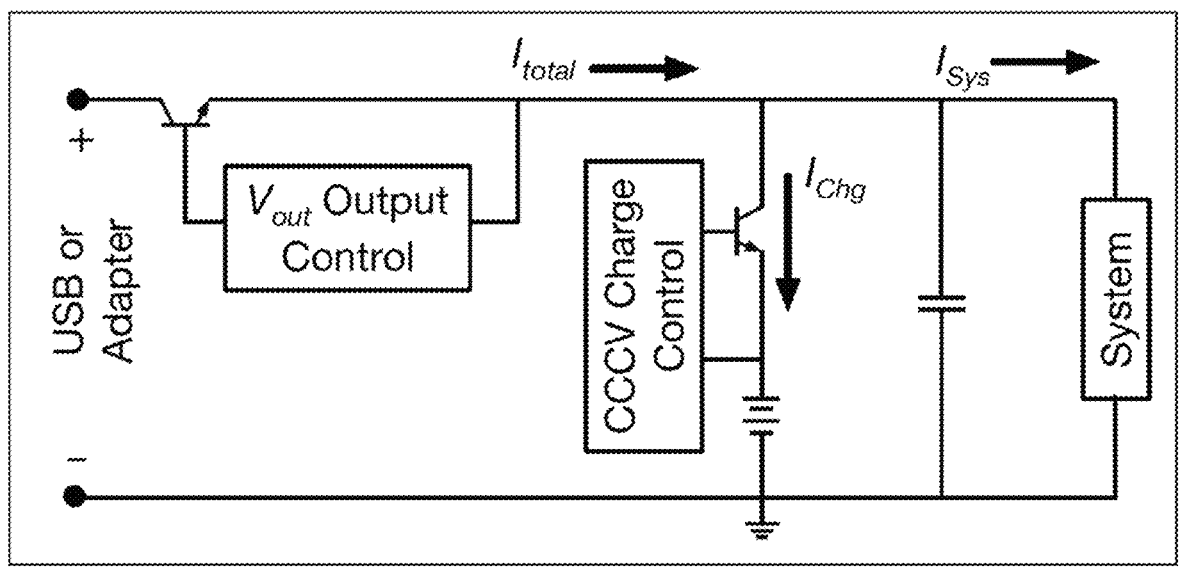
FIG. 18 is a schematic showing separated power paths from charger to battery and system, allowing the battery to rest after fully charged.
Figure 19:
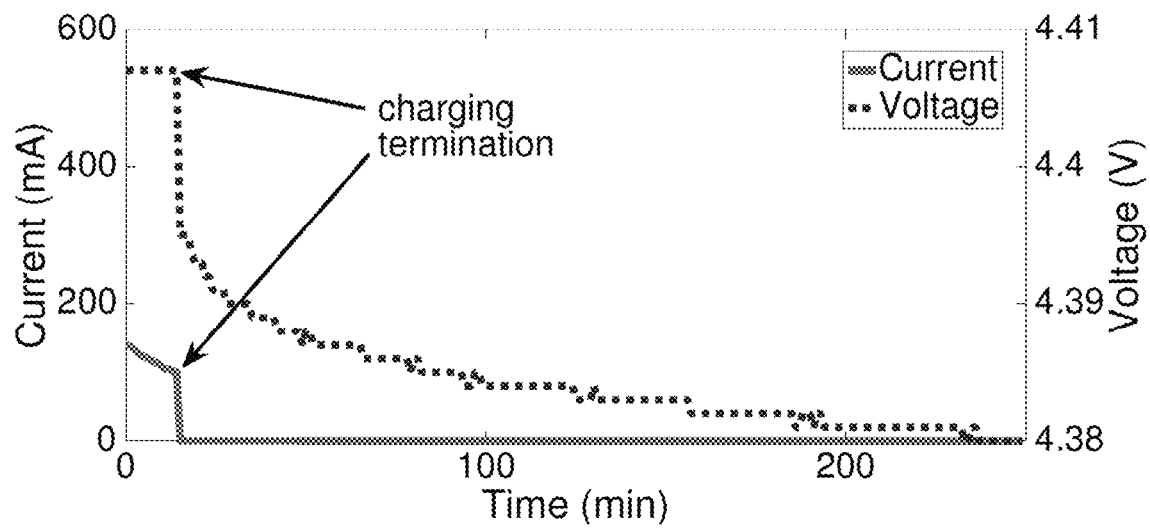
FIG. 19 is a graph showing resting in a Nexus 6P battery after fully charging it.

In one embodiment, R-Aware learns these linear coefficients by collecting the voltage-drop traces of idle batteries from a device-charging history, and linear fitting $\Delta V_1$s and $\Delta V_{total}$s therein. This is feasible because of the separated power paths of mobile devices as shown in FIG. 18. The charger power is separated into two flows to power the device and charge the battery, allowing the battery to rest thus collecting its voltage-drop traces, e.g., by keeping the charger connected after fully charging the battery during night-time. To verify this, the charger is kept connected after fully charging a Nexus 6P phone and its battery voltage and current are recorded as shown in FIG. 19. The battery current reduces to, and stays at 0 mA after the charging is completed, and its voltage drops first instantly and then gradually, agreeing with FIG. 16.

Next let's consider the estimation of $\Delta V_1$. According to basic physics, $\Delta V_1 = I_{cutoff} \cdot r_1$ for any charging process ending with $I_{cutoff}$, so the question transforms to the estimation of $r_1$ after the charging completion. With continued reference to FIG. 14, the ohmic resistance $r_1$ and the capacitive resistance $r_2$ of the cell are estimated at 142. In an example embodiment, R-Aware estimates $r_1$ by applying a current pulse 1 to the battery before charging it, and monitoring its instant voltage response $\Delta v$, i.e., $$r_1 = \frac{\Delta v}{I} \tag{4}$$

Figure 20:
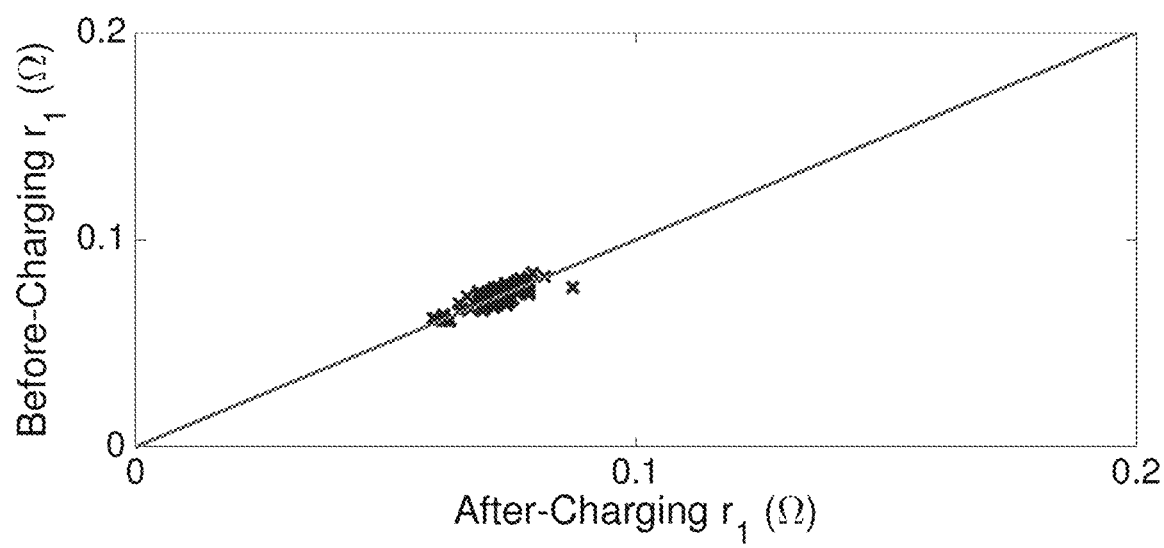
FIG. 20 is a graph showing the ohmic resistance ($r_1$) is stable before and after charging.

However, this before-charge $r_1$ may differ from the after-charge $r_1$, because battery resistance varies over time. Again, it is shown via measurements that $r_1$ does not vary much over a single charge of batteries. FIG. 20 compares $r_1$ measured before and after charging the batteries based on 115 empirically collected traces. The fact that most samples fall along the line of y=x supports R-Aware to use the before-charge $r_1$ to estimate that after charging.

Given the ohmic resistance for the cell, the current cutoff limit can be determined at 143 as a function of the ohmic resistance. $\Delta V_1$ is computed as $\Delta V_1 = I_{cutoff} \cdot r_1$, and thus $\Delta V_{total} = a \cdot (I_{cutoff} \cdot r_1) + b$. In this way, R-Aware determines the desired current cutoff limit, $I_{cutoff}$ as $$\Delta V_2 \leq \theta \Leftrightarrow I_{cutoff} \leq \frac{\theta - b}{(a-1) \cdot r_1}. \quad (5)$$

Capacitive resistance $r_2$ can then be estimated by $$r_2 = \frac{\Delta V_{total} - \Delta V_1}{I_{cutoff}}. \quad (6)$$

Other techniques for determining the current cutoff limit are contemplated and fall within the broader aspects of this disclosure. A voltage higher than the battery voltage is required to charge it, i.e., $V_{cv}$ must be higher than the battery voltage when switching from CC-Chg to CV-Chg. From the circuit model in FIG. 8, it is known that the battery voltage would drop to $(V_{cc} - I_{cc} \cdot r_1)$ instantly when CC-Chg is terminated without starting CV-Chg, such that $$V_{cv} \geq V_{cc} - I_{cc} \cdot r_1$$

On the other hand, FIG. 11 shows that a larger $V_{cv}$ extends the OCV range for charging the battery with CV-Chg, indicating that a small $V_{cv}$ is desired to shorten the CV-Chg period. The combination of these two observations makes R-Aware set $V_{cv}$ as $$V_{cv} = V_{cc} - I_{cc} \cdot r_1. \quad (7)$$

Returning to FIG. 14, the last step is to identify the threshold voltage $v_{cc}$ to which the battery cell is to be charged with a constant current as indicated at 144. The threshold voltage, together with the above-identified control parameters, maximizes the charged capacity within the user's available time $T_{available}$. The total charged capacity with R-Aware is $$C_{total} = \frac{C_0 \cdot (\mathbb{D}(v_0) - \mathbb{D}(V_{cv} - I_{cutoff} \cdot r))}{100} \quad (8)$$
$$= \frac{C_0 \cdot (\mathbb{D}(v_0) - \mathbb{D}(V_{cc} - I_{cc} \cdot r_1 - I_{cutoff} \cdot r))}{100}$$

where $C_0$ is the total battery capacity when it is fully charged, e.g., 1024.7 mAh for the Nexus S battery as shown in FIG. 9.

All things being equal, a larger $V_{cc}$ leads to a larger $C_{total}$ since $\mathbb{D}(v)$ monotonically decreases with v. So, a search space is defined from which to determine the threshold voltage and the search space is searched in a top down manner starting with the maximum voltage to which the battery cell can be charged to. More specifically, the potential range of $V_{cc}$ is searched and returns the first charging profile that completes within $T_{available}$, which charges the device to the maximum capacity. This, however, requires estimation of the charging duration with a given R-Aware-based charging profile: both the CC-Chg duration $T_{cc}$ and the CV-Chg duration $T_{cv}$.

The charged capacity and the charging time of R-Aware-based CC-Chg can be computed by $$C_{cc} = \frac{C_0 (\mathbb{D}(v_0) - \mathbb{D}(V_{cc} - I_{cc} \cdot r))}{100} \quad (9)$$

$$T_{cc} = \frac{C_{cc}}{I_{cc}}. \quad (10)$$

So, $C_{cv}$ can be estimated based on (8) and (9) by $$C_{cv} = C_{total} - C_{cc}. \quad (11)$$

Figure 21:
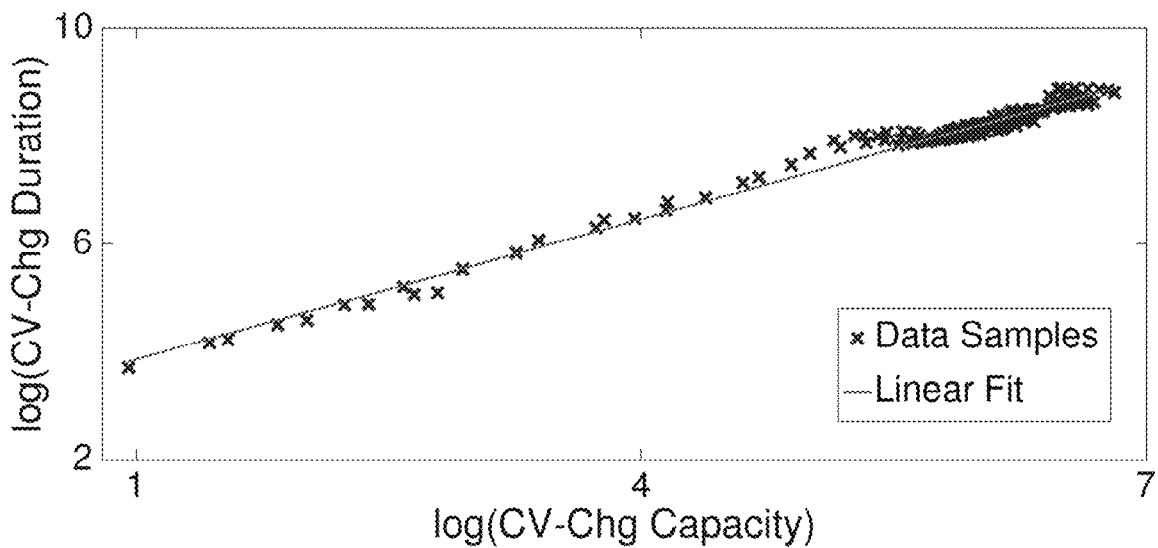
FIG. 21 is a graph showing Log-log plot of $T_{cv}$ and $C_{cv}$ demonstrate a linear relation.

Moreover, measurements show $T_{cv}$ and $C_{cv}$ to be log-log-linear to each other, i.e., $\log(T_{cv}) = c \cdot \log(C_{cv}) + d$, based on which $T_{cv}$ can be estimated. To demonstrate this, FIG. 21 shows the log-log plot of $T_{cv}$ and $C_{cv}$ from 174 charging traces, along with their corresponding linear fit $lot(T_{cv}) = 0.8648 \cdot \log(C_{cv}) + 3.0024$, which has a mean-squared error of 0.0162. The details of these traces are summarized in Table 3.

TABLE 3

Measurement settings to validate $\log(T_{cv} = c \cdot (C_{cv})) + d$.

| #Batt. | Ini. OCV | $I_{cc}$ | $V_{cc}$ | $V_{cv}$ | $I_{cutoff}$ |
|---|---|---|---|---|---|
| 4 | 3.36-3.74 V | 0.5-1 C | 3.90-4.20 V | 3.89-4.19 V | 0.05-0.1 C |

The log-log-linearity holds because the current trace of CV-Chg conforms to the shape of $I_{cv}(t) = A \cdot t^B$, as illustrated in FIG. 10. This way, we know $$C_{cv} = \int_0^{T_{cv}} I_{cv}(t) dt = \frac{A}{B+1} T_{cv}^{B+1}, \quad (12)$$

and thus $$\log(T_{cv}) = \frac{1}{B+1} \log(C_{cv}) - \frac{1}{B+1} \log\left(\frac{B+1}{A}\right),$$

demonstrating a log-log-linear relation. Again, we learn these linear coefficients from the device-charging history and estimate $T_{cv}$ as $$T_{cv} = e^{c \cdot \log(c_{cv}) + d}. \quad (13)$$

Based on these findings, an example R-Aware method for determining the four control parameters of the proposed charging algorithm is set forth below. R-Aware adopts $I_{cc}$ from the fast charging algorithm implemented on the device (line 1), and then identifies $I_{cutoff}$ that offers sufficient relaxation to the battery (line 2-3). The two voltage parameters are identified by searching down the potential voltage range with a granularity of $\delta_v$, (line 4-9).

Algorithm 1 R-Aware Charging.

1: set $I_{cc}$ as in fast charging;
2: estimate $r_1$ and $r_2$ by (4) and (6);
3: determine $I_{cutoff}$ by (5);
4: for $V_{cc} = V_{max} : -\delta_v : v_0$ do
5:     $V_{cv} = V_{cc} - I_{cc} \cdot r_1$ (as in (7));
6:     estimate $C_{total}, C_{cc}$ and $C_{cv}$ by (8), (9), and (11);
7:     estimate $T_{cc}$ and $T_{cv}$ by (10) and (13);
8:     if $T_{cc} + T_{cv} \leq T_{availible}$ then
9:         break;
10:     end if
11: end for
12: return $<I_{cc}, V_{cc}, V_{cv}, I_{cutoff}>_{R-Aware}$ ;

R-Aware has a complexity of $$O\left(\log\left(\frac{V_{max} - v_0}{\delta_v}\right)\right)$$

when using a binary search in the for loop.

Figure 34:
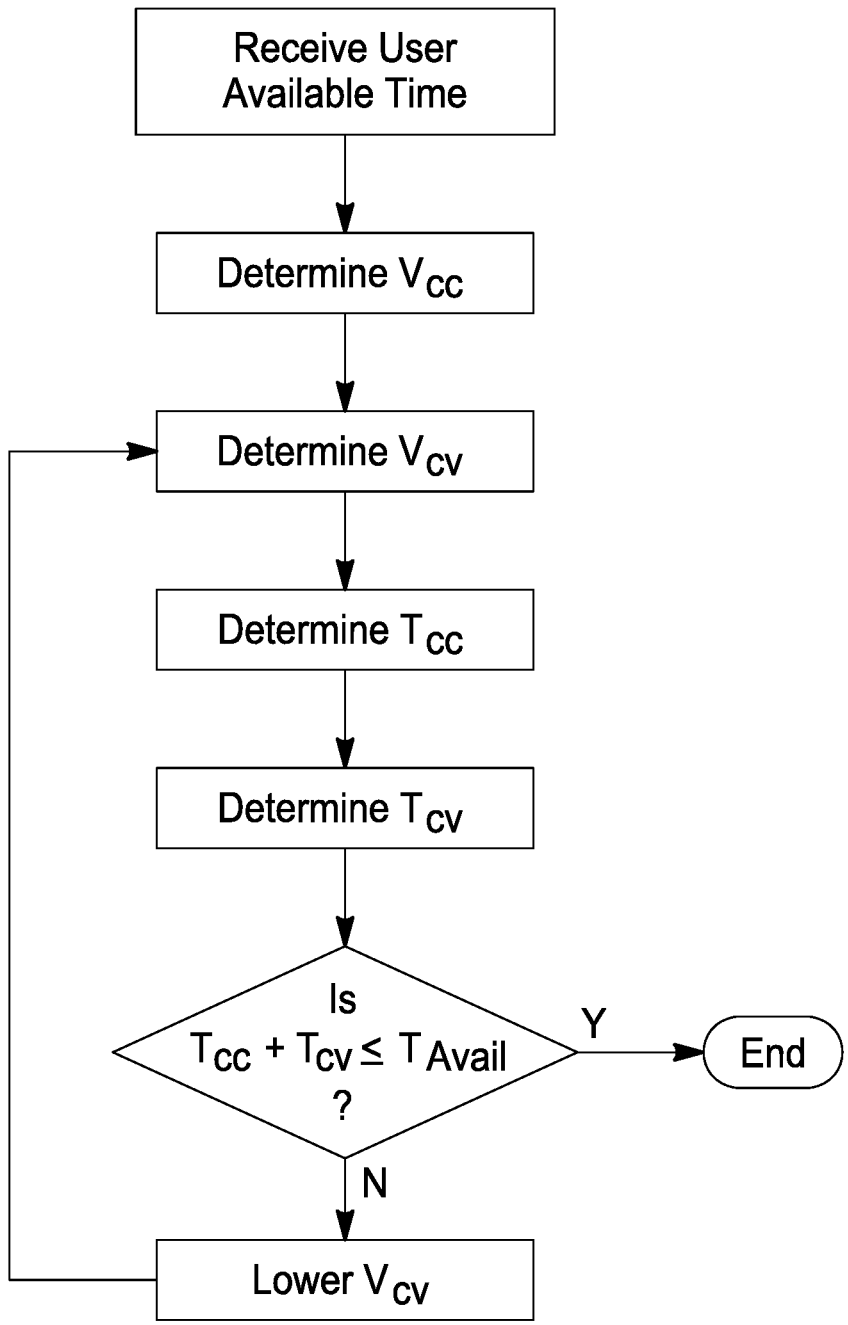
FIG. 34 is a flowchart illustrating the step of Algorithm 1.

This algorithm is also illustrated in FIG. 34.

Figure 22:
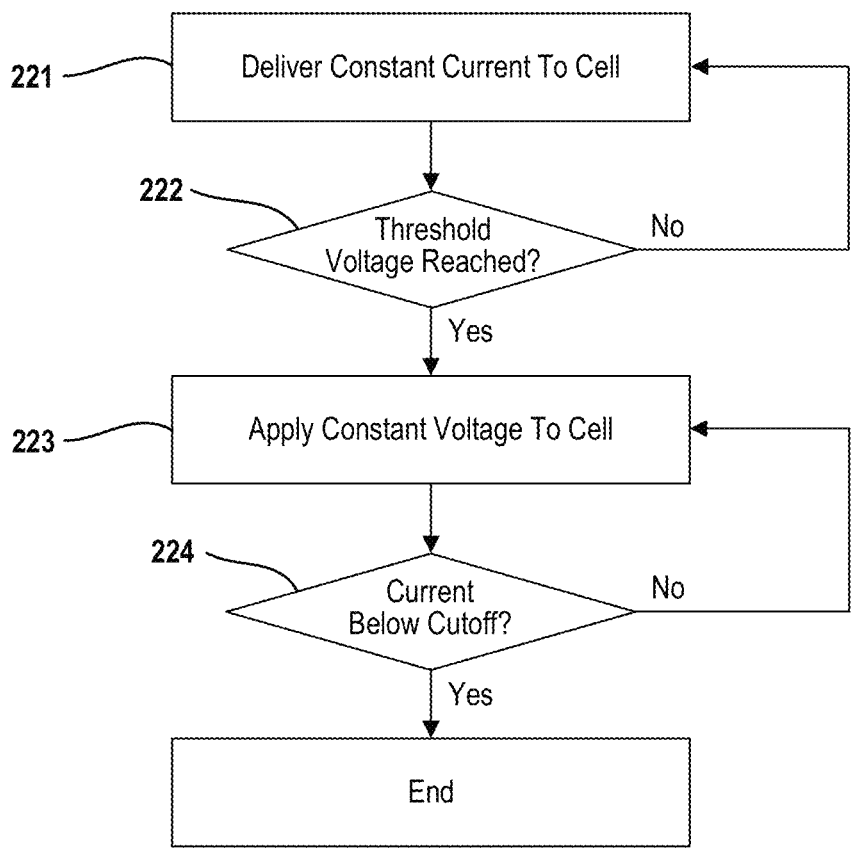
FIG. 22 is a flowchart illustrating an example charging algorithm in accordance with this disclosure.

FIG. 22 depicts an example implementation of the user-aware charging algorithm. First, a constant current is delivered at 221 to the battery cell. During this phase, a current with a constant magnitude (e.g., 1 Amp) is delivered to the battery cells. In this example, the threshold value is set to $V_{cc}$ as determined in the manner described above. Cell voltage is monitored at 222. The constant current is delivered until the cell voltage reaches a threshold value.

Once the cell voltage reaches the threshold value, a constant voltage is applied to the battery cells as indicated at 223. In this example, the applied voltage is set to $V_{cv}$ as determined in the manner described above. During this phase, the charging current is monitored at 224. When the charging current decreases below a specified cutoff level, voltage is no longer applied to the battery cells and the charging process is complete. It is to be understood that only the relevant steps of the methodology are discussed in relation to FIG. 22 but that other steps may be needed to control and manage the overall charging process.

Real-life evaluation of R-Aware's effectiveness in slowing down battery capacity fading is challenging owing to its dependency on user behavior. This is just as challenging as for Apple or Samsung to specify the operation time of their phones, in which case only the operation time under simplified conditions is provided, e.g., an up to 14-hour talk time on 3G for iPhone 6 without user interactions. In this section, an in-lab evaluation of the accuracy of R-Aware in predicting the charging process and its effectiveness in slowing down battery capacity fading is described. Its real-life effectiveness is then analyzed based on these experimental results as well as real-life user traces.

R-Aware needs the battery OCV-DoD table to plan the charging process. A battery tester is used to charge the battery with 200 mA current and sample the process at 1 Hx, observing the relation between the battery terminal voltage and its DoD. Resistance compensation is then performed on the thus-collected traces based on (2) to derive the OCV-DoD table. Likewise, obtain the OCV-DoD curves in FIG. 9.

Figure 23A:
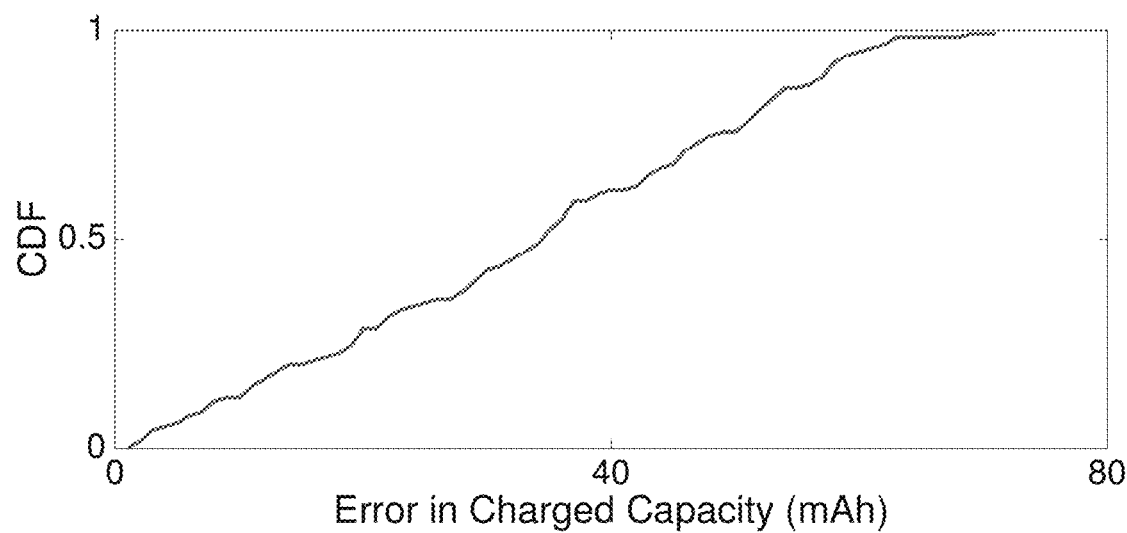
FIGS. 23A and 23B are graphs showing accuracy of R-Aware in predicting the charging process.
Figure 23B:
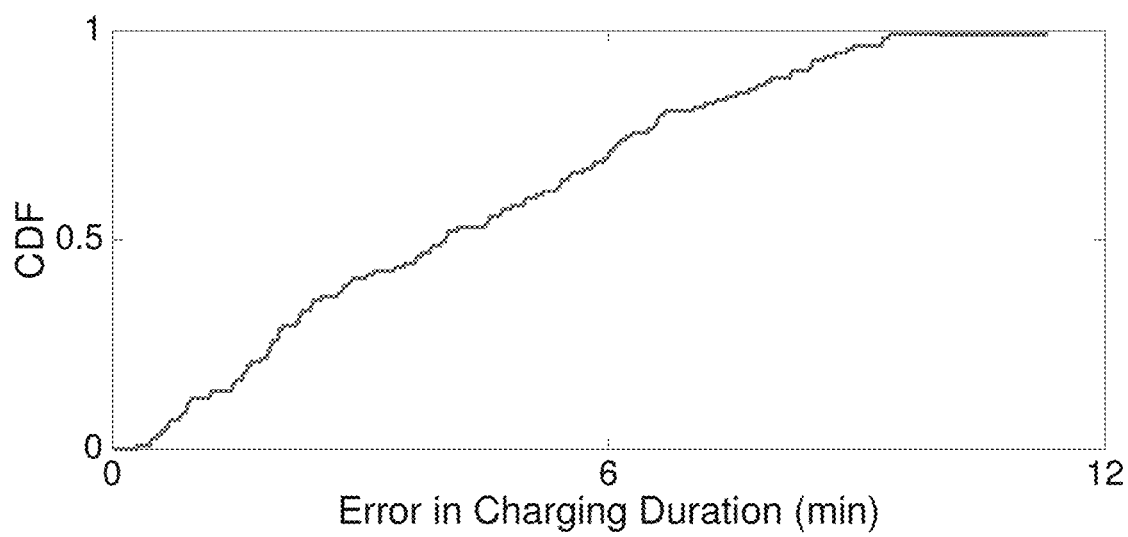

The accuracy in estimating the charging duration and charged capacity with a given profile is key to R-Aware. 115 R-Aware-based charging traces were collected with various charging profiles as summarized in Table 4 below. R-Aware takes these profiles as input to estimate the corresponding charging processes, which are then compared with the empirical traces to verify its estimation accuracy. FIGS. 23A and 23B summarizes the estimation errors. The estimation errors in charged capacity are within 60 mAh for 96% of the traces, with only 5 traces slightly off at 60.2 mAh. These errors correspond to a ratio of about $$\frac{60}{2{,}600} \times 100\% = 2.3\%$$

of the rated battery capacity. The error in estimating the charging duration is within 10 minutes for all traces with only an exception at 11.3 minute. This corresponds to an averaged ratio of 5.5% of their total charging durations.

TABLE 4

Collected charging traces to validate R-Aware's accuracy.

| # of Batt. | Ini. OCV | $I_{cc}$ | $V_{cc}$ | $V_{cv}$ | $I_{cutoff}$ |
| --- | --- | --- | --- | --- | --- |
| 8 × 2, 600 mAh | 3.37-3.81 V | 0.5-1 C | 3.9-4.2 V | 3.85-4.2 V | 0.05-0.1 C |

Figure 24:
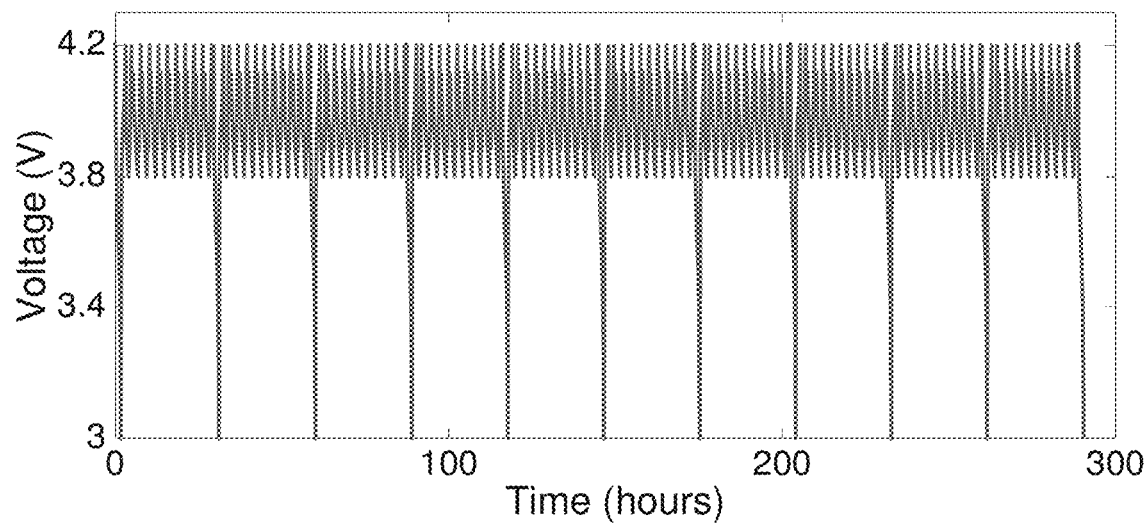
FIG. 24 is a graph showing voltage traces during one cycling measurement.
Figure 25A:
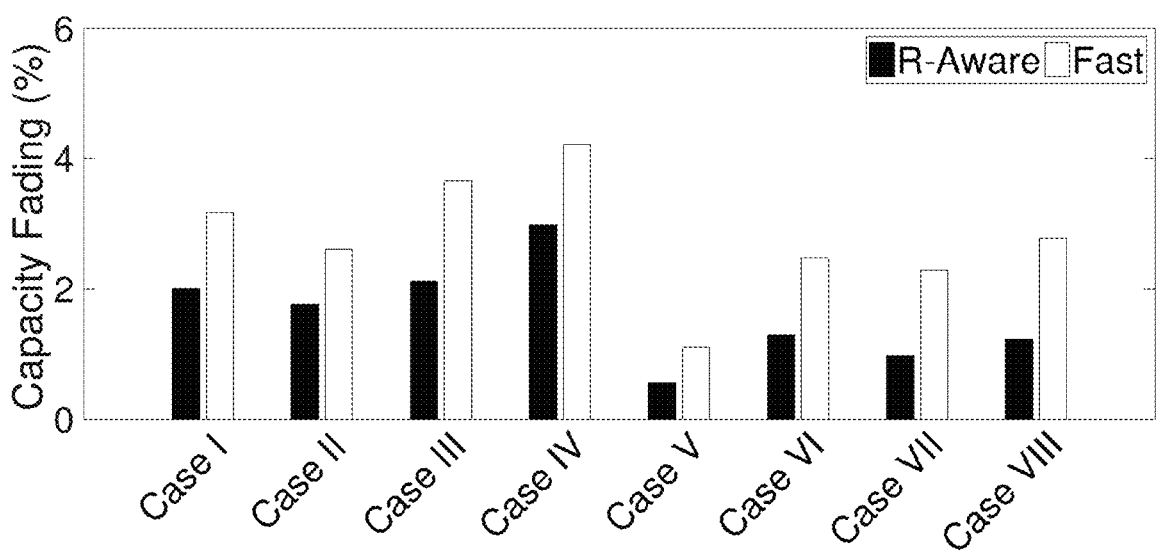
FIGS. 25A and 25B are graphs showing how R-Aware slows down battery capacity fading by up to 60%.
Figure 25B:
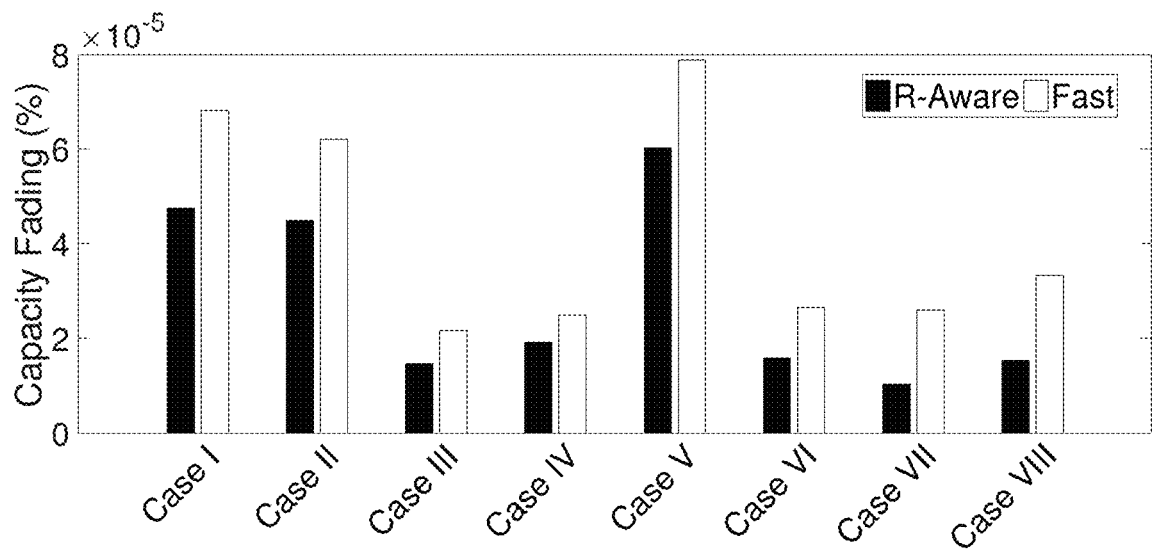

Next, the effectiveness of R-Aware in slowing down the battery capacity fading is evaluated. Experiments were conducted with 8 batteries which are charged with both R-Aware and fast charging as summarized in Table 5. To study the capacity fading due to charge/discharge cycling, the charged batteries are discharged with a 500 mA current until their OCVs decreased to the initial levels, and repeated the charge/discharge cycle 100 times. The batteries were fully charged and discharged ever 10 such cycles to collect their total deliverable capacities. Each of these measurements lasts up to 16 days. FIG. 24 plots the voltage races during one of these cycling tests as an illustration. Note that the fast charging process was terminated before batteries were fully charged due to the limited time available for charging. FIG. 25A plots the total capacity fading after these cycling measurements. The batteries fade 0.5-2% when charged with R-Aware, while those with fast charging fade 1-4.2%, showing a 43.9% slowdown of capacity fading on average. Averaging the capacity fading over the total capacity delivery during the measurements, FIG. 25B shows the batteries' fading rates per delivered-capacity. R-Aware shows down capacity fading by 36.5% on average, and up to 60% in certain extreme cases.

TABLE 5

Experimental settings.

| Cases | Ava. Time | Ini. OCV | θ |
| --- | --- | --- | --- |
| I | 100 min | 3.120 V | 0.02 V |
| II | 90 min | 3.232 V | 0.02 V |
| III | 70 min | 3.866 | 0.02 V |
| IV | 70 min | 3.853 | 0.02 V |
| V | 60 min | 3.200 V | 0.02 V |
| VI | 60 min | 3.878 V | 0.02 V |
| VII | 55 min | 3.869 V | 0.02 V |
| VIII | 30 min | 3.505 V | 0.02 V |

The effectiveness of proposed charging algorithm was also evaluated in real life based on the user-traces as shown in FIG. 3 (and Table 1) and the experimental results in FIG. 25.

FIG. 25 shows an average capacity fading rate of 0.0161% and 0.0279% per cycle when the device is charged with R-Aware and incomplete fast charging, respectively. Further assume a 0.016% fading rate when the device is charged completely with fast charging, which is reasonable because enough relaxation is applied to its battery as with R-Aware. Adopt the following linear model to estimate the fading rate in real life.

$$[0.0279 \cdot (1-p)(1-q) + (0.0161 \cdot (1-p)(1-q))]\%/\text{cycle}, \quad (14)$$

when the user chooses R-Aware to charge his device with probability p, and there is enough time to complete the charging with probability q if fast charging is selected.

Let's consider the following users' charging patterns. In Always-Fast, users always charge their devices with fast charging regardless of their available time, i.e., p=0 in (14). This is the conventional approach to charging mobile devices. In Fast+R-Aware, under this mixed charging pattern, users charge their devices with fast charging if there is enough time for full charging; otherwise, they use R-Aware to keep their battery healthier, i.e., q=1 in (14).

Figure 26:
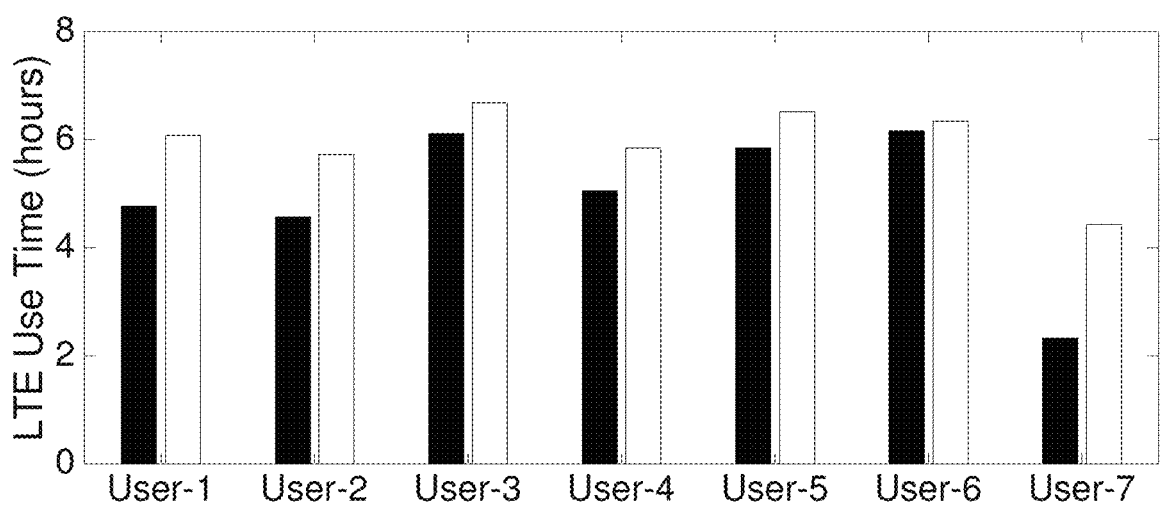
FIG. 26 is a graph showing LTE time after 2-year usage.

Nexus 5X is reported to have an initial 8-hour LTE use time, which gets shortened over usage due to capacity fading. FIG. 26 plots the estimated LTE time over a 2-year period for these 7 users when they charge the devices with the two patterns. The devices operate longer up to 2.1 hours under the mixed charging pattern after 2 years when the proposed charging algorithm is available to them. Also, user behavior significantly affects device operation: higher chance of incomplete charging and higher frequency of charging make the proposed charging algorithm more effective in slowing down battery fading.

Figure 27A:
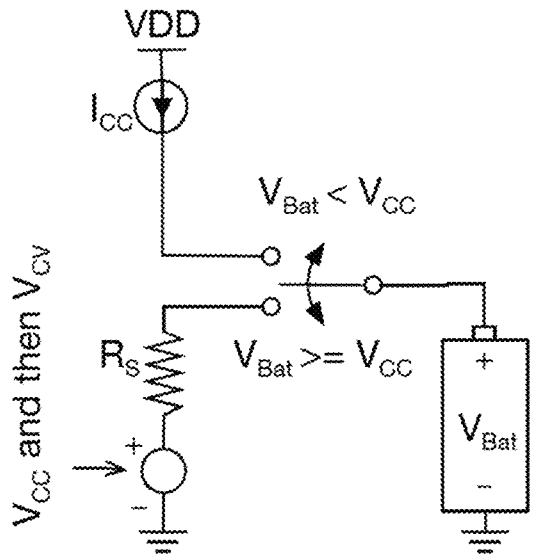
FIGS. 27A and 27B are schematics of a circuit logic for R-Aware and CCCV, respectively.
Figure 27B:
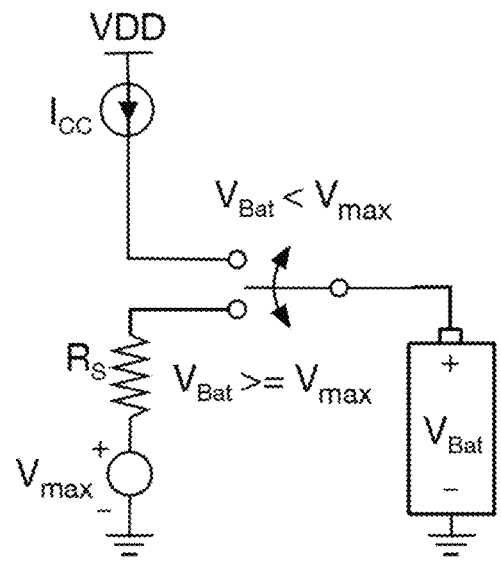

R-Aware was also implemented on commodity Android phones to verify its feasibility and deployability. FIG. 27 shows the circuit logic of R-Aware and compares it with the CCCV-based charging, such as fast charging. For CCCV, the current source outputs $I_{cc}$ and the voltage source supplies $V_{max}$. The switch selects CC-Chg or CV-Chg based on real-time feedback of the battery voltage. On top of this CCCV implementation, R-Aware poses only one additional requirement for the voltage source to supply $V_{cc}$ first and then $V_{cv}$—an evolution from one single voltage threshold to two voltage thresholds sequentially. This way R-Aware does not require any additional circuit beyond existing CCCV implementation.

To implement R-Aware on mobile devices, one needs (i) the ability to actively configure the charging profile, (ii) the OCV-DoD table of device battery, and (iii) the initial SoC of the device before charging.

Existing charger drivers on mobile devices support the active configuration of charging profile. In the case of Nexus 6P, for example, its battery charger driver defines the interfaces shown in FIG. 28 to configure the charging process. Specifically, the qpnp_chg_ipattern_set( ) function allows for seeing the terminating current $I_{cutoff}$, the maximum charging current can be set with qpnp_chg_ibatmax_set( ) and $V_{cc}$ and $V_{cv}$ can be configured with the last two functions. Similar interfaces can be found in the kernels of other devices, such as Nexus 5X, Xperia Z, and Galaxy S6 Edge. The corresponding inputs to these interfaces can be accessed from the directory of/sys/class/power_supply/battery/. For example, $V_{cc}$ and $V_{cv}$ can be set by writing proper values to /sys/class/ower_supply/battery/voltage max.

Figure 29:
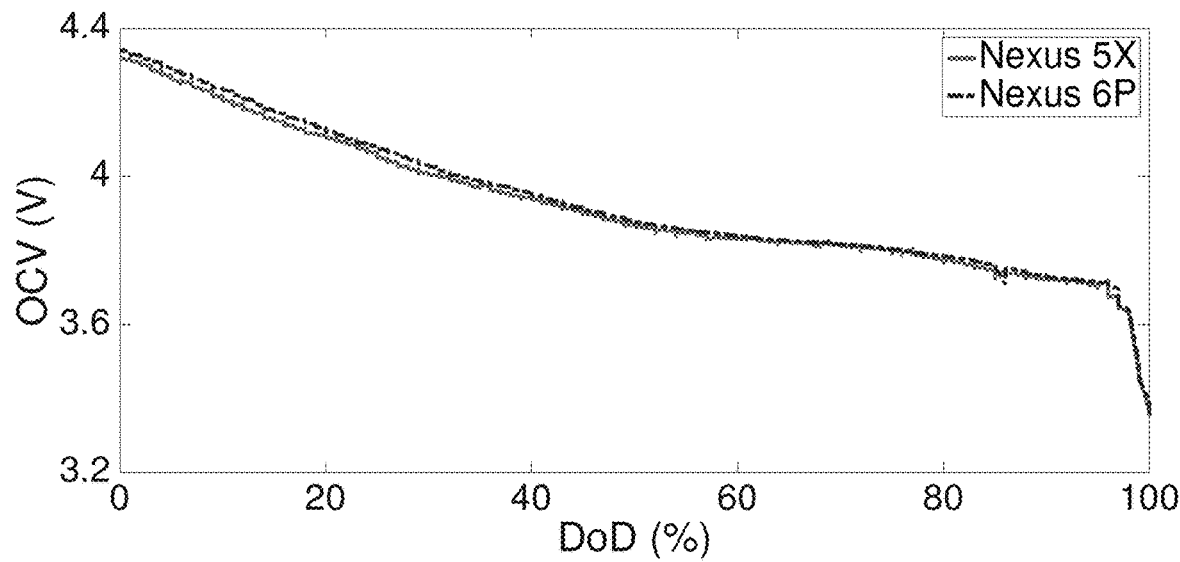
FIG. 29 is a graph showing OCV-DoD curves collected from Nexus 5X and Nexus 6P.

Similarly, writing a small current to the file current_max facilitates to collect the OCV-DoD table of the device battery with high accuracy, similarly to the discussion earlier. FIG. 29 shows the thus-collected OCV-DoD curves of Nexus 5X and Nexus 6P phones with a maximum charging current of 300 mA and 500 mA, respectively.

Last but not the least, the real-time SoC of device batteries can be obtained using BatteryManager in Android, which also provides real-time battery voltage, allowing the logging of the charging process.

Figure 30:
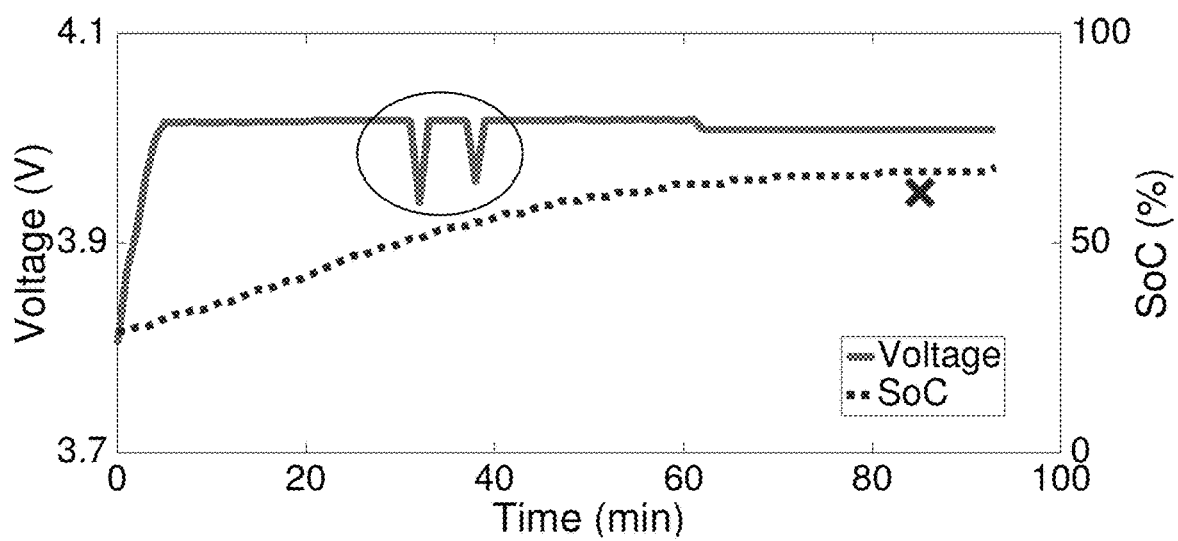
FIG. 30 is a graph showing R-Aware-based charging process in Case-I on Nexus 5X.

R-Aware was implemented on Nexus 5X and 6P, and its performance evaluated via 5 case-studies, as summarized in Table 6. The errors of R-Aware in estimating the charging duration are within the range of (−10, +4) minutes and those in the charged capacity are in the range of (−5, +1)%. FIG. 30 shows the charging process in Case-I as an illustration, where x is the estimated charging results by the proposed charging algorithm. Another interesting observation is that there are two valleys in the voltage trace as highlighted. They occur because the battery temperature has risen to a pre-defined threshold of 45° C., forcing the charging current to be reduced (and thus the voltage to drop) for cooling. This, in turn, supports R-Aware that does not push for larger $I_{cc}$, as explained earlier.

TABLE 6

Phone-based case-study results.

| | | | | Charging Time (min) | | | End-of-Charge SoC (%) | | |
|---|---|---|---|---|---|---|---|---|---|
| Cases | Device | Available Time | Initial SoC | Estimated | Ground Truth | Error | Estimated | Ground Truth | Errror |
| I | Nexus 5X | 90 min | 29% | 84.79 | 93.00 | −8.21 | 62 | 68 | −4 |
| II | Nexus 5X | 80 min | 50% | 69.11 | 78.67 | −9.56 | 76 | 78 | −2 |
| III | Nexus 5X | 45 min | 6% | 44.96 | 42.00 | +2.96 | 14 | 15 | −1 |
| IV | Nexus 5X | 45 min | 4% | 42.32 | 39.00 | +3.32 | 11 | 10 | +1 |
| V | Nexus 6P | 60 min | 56% | 59.72 | 63.00 | −3.28 | 77 | 82 | −5 |

A user study was also conducted to collect the detailed users' feedback on the proposed charging algorithm, such as whether users are willing to have their device battery equipped with additional inter-active operations, and whether users want to use R-Aware for its extension of their device life despite its slower charging rate. The users study consists of two parts: a questionnaire-based survey and a conceptual app of the proposed charging algorithm used in real-life.

146 users were surveyed to collect their charging behavior and opinions on the proposed charging algorithms. These participants are from 5 countries (US, Canada, Korea, Singapore and China), aged from 15 to 40, and have various occupations such as government and commercial company employees, self-employers, school teachers, university facilities and students. The survey results corroborate the motivation of the proposed charging algorithms—i.e., slowing down the capacity fading of mobile device batteries is crucial—and demonstrate its attractiveness to users. Specifically, 80% of participants were aware that device charging affects battery fading; 89% of participants noticed the degradation of their device batteries over time; 70% of them regard it as crucial; 77% of them will use the proposed charging algorithm if available.

Moreover, with state-of-the-art charging solutions, 94% of the participants frequently prematurely terminated their device charging, leading to incomplete CV-Chg; 52% of them charge their devices more than twice a day; less than 16% of them tried to charge only when they have enough time for fully charging the devices. These indicate a large room for improvement by the proposed charging algorithm.

Furthermore, 13 participants (6 females and 7 males) were recruited to use a conceptual Android app of proposed charging algorithm in real-life. These participants are recruited from a user-study campaign posted online at a university students center. None of them had prior knowledge of this research. After they agreed to participate in a user study, we sent them the conceptual app of proposed charging algorithm, a short user manual, and a survey questionnaire regarding their opinion about the proposed charging algorithm. This app is referred to as conceptual because the system-level implementation of R-Aware introduced earlier needs root permission of the device, which is not a feasible requirement for the user study participants.

Figure 31:
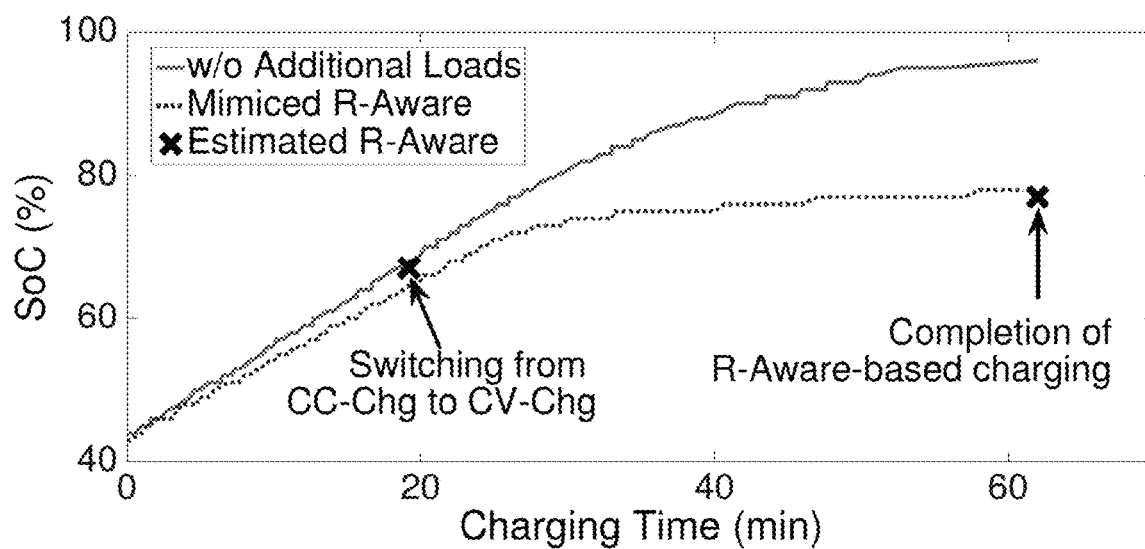
FIG. 31 is a graph showing a mimicked R-Aware-based charging process in the conceptual app of the proposed charging algorithm.

As explained in FIG. 18, the charger power is separated into two flows to charge the battery and power the device, respectively. Also, the charger's maximum output power is limited, e.g., 5V at 3A for Nexus 5X. This way, one can indirectly control the charging process by adjusting the power consumption of devices in the Android user space, mimicking a R-Aware-based charging process. Specifically, the conceptual app uses 10 levels of cumulative power consumptions as summarized in Table 7 to regulate the charging process as if R-Aware were implemented. The user-study verified these power consumption levels to be high enough to regulate the charging process. FIG. 31 shows one of thus-mimicked R-Aware-based charging process, which is slowed down to the estimated levels of R-Aware by adaptively adjusting the additional power consumptions imposed.

TABLE 7

Controlling device power consumption to mimic R-Aware-based charging. The specific values for Galaxy Note 4 are provided as an example.

| Level | Methodology | Load (mW) |
| --- | --- | --- |
| 1 | WiFi scan every 500 ms | 508 |
| 2 | WiFi scan every 250 ms | 635 |
| 3 | Enable GPS Location Sensing | 741 |
| 4 | WiFi scan continuously | 2,017 |
| 5 | Math calculation every 500 ms | 2,824 |
| 6 | Enable Microphone | 2,853 |
| 7 | Math calculation every 250 ms | 2,904 |
| 8 | Enable inertial sensors | 3,027 |
| 9 | Math calculation continuously | 5,554 |
| 10 | Bluetooth scan | 5,662 |

Figure 32B:
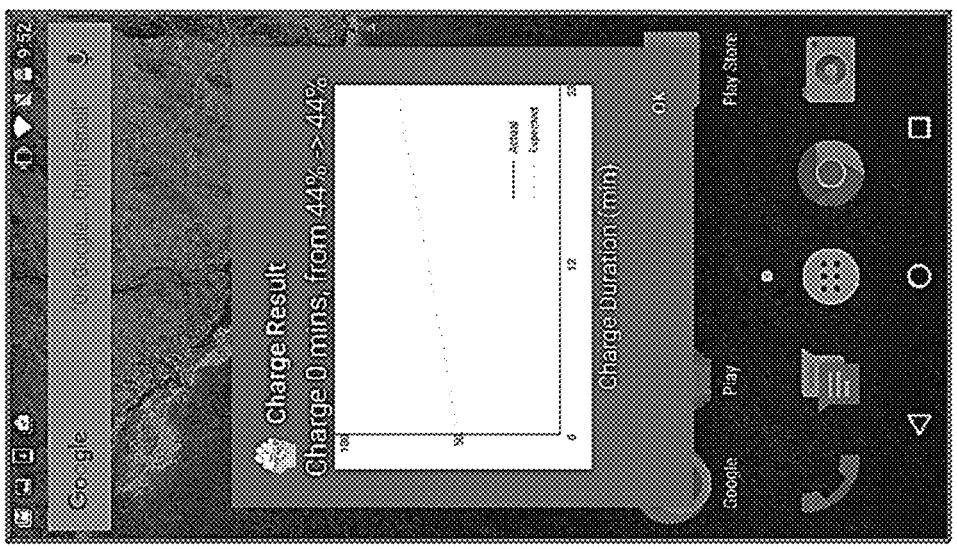
FIGS. 32A-32B illustrate example user interfaces for implementing the proposed charging algorithm.
Figure 32A:
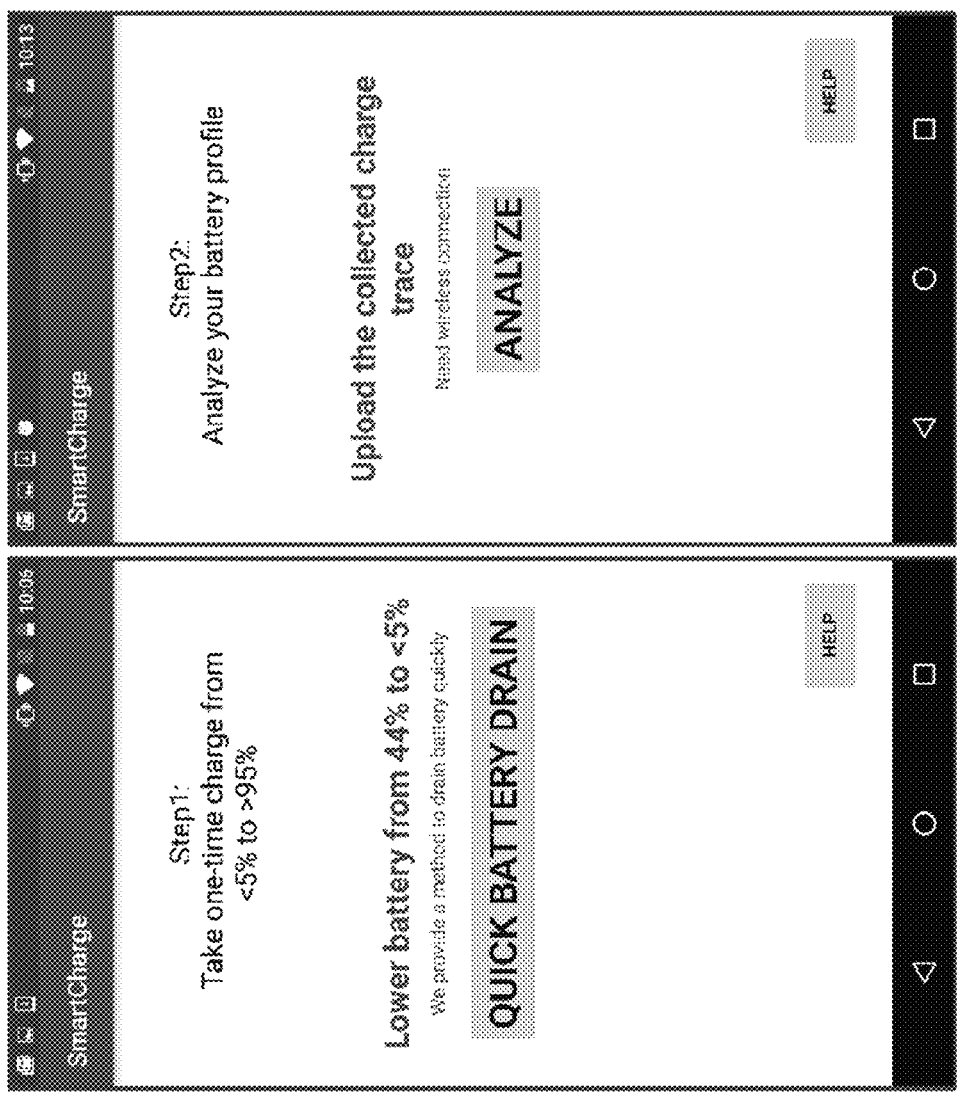

A one-time training is required for the conceptual app to collect the basic information of device battery, such as its OCV-DoD table and resistance, by draining the battery to below 5% and then charging it to higher than 95%. FIGS. 32A-32C present an example user-interface to guide users to finish this initial training. This conceptual app records the user's input of available time and selection of a charging method, logs the charging process, and uploads the collected data to our server when a WiFi connection is available.

The conceptual app uses fast charging as default if no user input is collected from the UI within 5 minutes after the device plugged in a charger. The device will be continuously charged with $I_{cutoff}$ if the user chooses R-Aware for charging but keeps the charger connected after the specified charging time elapsed, preserving the established equilibration. Also users may disconnect the charger before their specified charging time elapses. Although the proposed charging algorithm cannot prevent such cases, it would not cause additional fading when compared to the case where only fast charging is provided.

The changing behavior of these 13 participants was monitored over an accumulated period of 28 weeks, collecting 319 charging cases of which 49% were day-time charging that lasts less than 2 hours, agreeing with the statistics shown in FIG. 3; 36% used R-Aware (up to 65% for certain specific users), showing users' willingness to care for their device batteries at the costs of slower charging rate and some user interactions; and users completed their input on the available time and choose their preferred charging method within a medium of 8 seconds, validating the user-friendliness of the proposed charging algorithm; this interaction time decreases as users become more familiar with the UI.

Capacity fading exists in all battery powered systems, including electric vehicles (EVs). In fact, the proposed charging algorithm is not only applicable to mobile devices, but also desperately needed for electric vehicles for two reasons. First, the battery packs of EVs are expensive, e.g., replacing the 70 kWh battery pack of Tesla Roadster costs as high as $29,000. Slowdown of battery fading means reduced operating cost for users. It is also attractive to EV manufactures as a slower fading rate reduces the battery pack size with the same warranty period, thus reducing the capital cost for users and increasing the competitive of products for manufacturers. Second, the available charging time would always be limited for certain types of EVs, e.g., taxis, causing pronounced capacity fading due to the early-termination of CV-Chg. This on the other hand, offers more room for improvement with the proposed charging algorithm.

R-Aware needs users' available time as input to plan the charging, which is provided via a user-interactive interface. Yet, this incurs overhead to users (e.g., seconds of interaction time) and the users may not always follow their input (e.g., early disconnection of the charger before the specified time or keeping the connection after the charging time elapsed), both of which have been reflected in our user study introduced earlier in this disclosure. Another choice is to predict users' available charging time and needed power in real time by learning their usage behavior. This way, no additional user actions are required and the new charging paradigm offered by the proposed charring algorithm would be automatically triggered upon connecting the charger. The challenge, however, is to ensure high prediction accuracy so as not to degrade user experience. It is also possible to further improve the accuracy of R-Aware in predicting the charging process based on the user's charging history.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real-time network operating systems.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Figure 33:
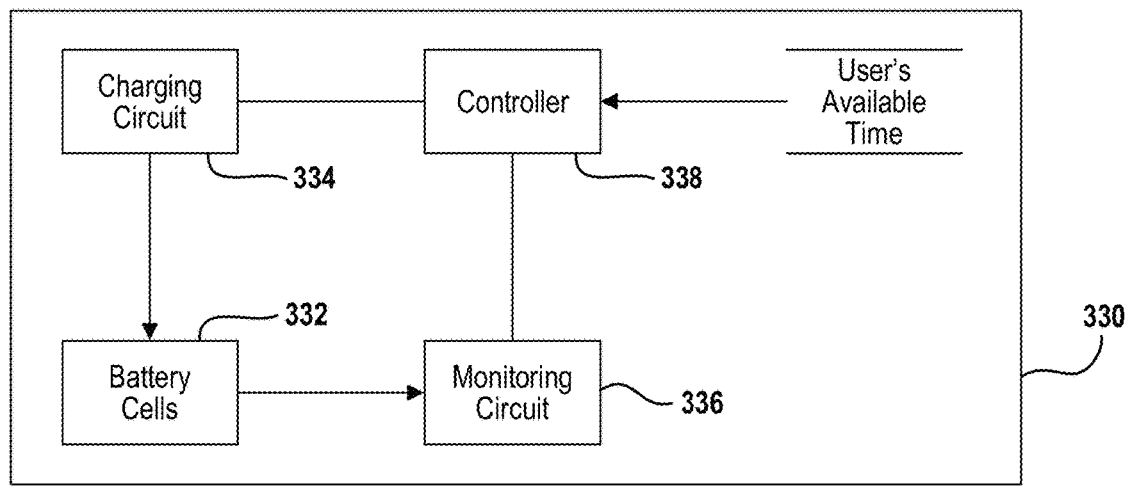
FIG. 33 is a diagram depicting an example system for charging one or more battery cells.

The present disclosure also relates to an apparatus for performing the operations herein. FIG. 33 depicts an example system 330 for charging one or more battery cells 332. The system 330 is comprised of a charging circuit 334, a monitoring circuit 336 and a controller 338. The charging circuit 334 operates to deliver a constant current and/or a constant voltage to the battery cells. The monitoring circuit 336 monitors the amount of charge held by the battery cells as well as other parameters indicative of the state of the battery cells and/or the charging process. Different constructs for such circuits 334, 336 are readily known in the art. Based on the information received from the monitoring circuit 116, the controller 338 determines the quantity and duration of the current and/or voltage to be applied to the battery cells, for example using the algorithm set forth above. The controller 338 in turn interacts with the charging circuit 334 to deliver the current and/or voltage to the battery cells. In some embodiments, these system components are packaged together in a housing of a charging device.

In some embodiments, the controller 338 may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for charging a battery cell having lithium-ion composition, comprising:

receiving a user available time in which the battery cell is to be charged;

determining a threshold voltage to which the battery cell is to be charged with a constant current, where the threshold voltage is less than a maximum voltage to which the battery cell can be charged to;

estimating an expected amount of time for delivering a constant current;

determining a secondary voltage which is to be applied constantly to the battery cell during a secondary charging phase;

estimating an expected amount of time for delivering the secondary voltage, wherein the threshold voltage and the secondary voltage are determined iteratively until sum of the expected amount of time for delivering a constant current and the expected amount of time for delivering the secondary voltage is less than the user available time;

delivering the constant current to the battery cell until voltage of the battery cell reaches the threshold voltage; and applying the secondary voltage to the battery cell until charging current for the battery cell falls below a current cutoff limit, where the secondary voltage is applied in response to detecting that the cell voltage equals the threshold voltage.

2. The method of claim 1 further comprises detecting occurrence of the cell voltage of the battery cell reaching the threshold voltage; and ceasing delivery of the constant current to the battery cell in response to detecting that the cell voltage equals the threshold voltage.

3. The method of claim 1 further comprises determining the current cutoff limit that enables relaxation voltage of the battery cell to reach a state of equilibrium after the constant current has been terminated.

4. The method of claim 1 further comprises determining ohmic resistance of the battery cell; and
determining the current cutoff limit as a function of the ohmic resistance.

5. The method of claim 4 wherein the ohmic resistance is determined by applying a current pulse to the battery cell before charging;
monitoring an instant voltage response across the battery cell caused by the current pulse; and
determining ohmic resistance by dividing the instant voltage by amplitude of the applied current pulse.

6. The method of claim 1 wherein determining a threshold voltage further comprises
defining a search space from which to determine the threshold voltage; and
starting with the maximum voltage to which the battery cell can be charged to, searching the search space in a top down manner to determine the threshold voltage.

7. The method of claim 6 wherein searching the search space further comprises:
a) determining the secondary voltage as a function of the threshold voltage, the constant current and the ohmic resistance of the battery cell;
b) estimating an expected amount of time for delivering a constant current;
c) estimating an expected amount of time for delivering the secondary voltage;
d) determining a sum of the expected amount of time for delivering a constant current and the expected amount of time for delivering the secondary voltage; and
e) lowering value of the threshold voltage and repeating steps a) in response to the sum of the expected amount of time for delivering a constant current and the expected amount of time for delivering the secondary voltage exceeding the user available time.

8. The method of claim 1 further comprises setting the constant current to a value of the maximum charging current specified by a battery charger associated with the battery cell.

9. A method for charging method for charging a battery cell having lithium-ion composition, comprising:
   a) receiving a user available time in which the battery cell is to be charged;
   b) determining a threshold voltage to which the battery cell is to be charged with a constant current, where the threshold voltage is less than a maximum voltage to which the battery cell can be charged to;
   c) determining a secondary voltage which is to be applied constantly to the battery cell during a secondary charging phase, where the secondary voltage is determined as a function of the threshold voltage, the constant current and the ohmic resistance of the battery cell;
   d) estimating an expected amount of time for delivering a constant current;
   e) estimating an expected amount of time for delivering the secondary voltage;
   f) determining a sum of the expected amount of time for delivering a constant current and the expected amount of time for delivering the secondary voltage;
   g) lowering value of the threshold voltage and repeating the steps c)-f) in response to the sum of the expected amount of time for delivering a constant current and the expected amount of time for delivering the secondary voltage exceeding the user available time;
   h) delivering the constant current to the battery cell until voltage of the battery cell reaches the threshold voltage; and
   i) applying the secondary voltage to the battery cell until charging current for the battery cell falls below a current cutoff limit, where the secondary voltage is applied in response to detecting that the cell voltage equals the threshold voltage.

10. The method of claim 9 further comprises detecting occurrence of the cell voltage of the battery cell reaching the threshold voltage; and ceasing delivery of the constant current to the battery cell in response to detecting that the cell voltage equals the threshold voltage.

11. The method of claim 9 further comprises determining the current cutoff limit that enables relaxation voltage of the battery cell to reach a state of equilibrium after the constant current has been terminated.

12. The method of claim 9 further comprises
    determining ohmic resistance of the battery cell; and
    determining the current cutoff limit as a function of the ohmic resistance.

13. The method of claim 12 wherein the ohmic resistance is determined by
    applying a current pulse to the battery cell before charging;
    monitoring an instant voltage response across the battery cell caused by the current pulse; and
    determining ohmic resistance by dividing the instant voltage by amplitude of the applied current pulse.

14. The method of claim 12 further comprises setting the constant current to a value of the maximum charging current specified by a battery charger associated with the battery cell.

15. The method of claim 12 where the secondary voltage is determined in accordance with $$V_{cv} = V_{cc} - I_{cc} \cdot r_1$$

where $V_{cc}$ is the threshold voltage, $I_{cc}$ is the constant current and $r_1$ is the ohmic resistance of the battery cell.

16. A system for charging a battery cell, comprising:
    a charging circuit that delivers a constant current to the battery cell;
    a monitoring circuit that monitors amount of charge held by the battery cells; and
    a controller configured to receive a user available time in which the battery cell is to be charged and interfaced with the charging circuit and the monitoring circuit,
    wherein the controller determines a threshold voltage to which the battery cell is to be charged with a constant current and estimates an expected amount of time for delivering a constant current, where the threshold voltage is less than a maximum voltage to which the battery cell can be charged to;
    wherein the controller further determines a secondary voltage which is to be applied constantly to the battery cell during a secondary charging phase and estimates an expected amount of time for delivering the secondary voltage, where the threshold voltage and the secondary voltage are determined iteratively until sum of the expected amount of time for delivering a constant current and the expected amount of time for delivering the secondary voltage is less than the user available time;
    wherein the controller cooperatively operates with the charging circuit to deliver a constant current to the battery cell until voltage of the battery cell reaches the threshold voltage; and
    wherein the controller, in response to detecting that the cell voltage equals the threshold voltage, applies the secondary voltage to the battery cell until charging current for the battery cell falls below a current cutoff limit, where the secondary voltage is constrained by the user available time and a duration in which the secondary voltage is applied to the battery cell is minimized while achieving a state of equilibrium for relaxation voltage of the battery cell after terminating the constant current.

* * * * *

UNITED STATES PATENT AND TRADEMARK OFFICE
CERTIFICATE OF CORRECTION

| | | |
|---|---|---|
| PATENT NO. | : 11,258,285 B2 | Page 1 of 1 |
| APPLICATION NO. | : 15/984843 | |
| DATED | : February 22, 2022 | |
| INVENTOR(S) | : Kang G. Shin et al. | |

It is certified that error appears in the above-identified patent and that said Letters Patent is hereby corrected as shown below:

In the Claims

At Column 18, Claim number 7, Line number 67, delete "a)" and insert --a)-d)--.

Signed and Sealed this
Twenty-sixth Day of April, 2022

Katherine Kelly Vidal
*Director of the United States Patent and Trademark Office*